United States Patent
Yamashita et al.

(10) Patent No.: US 7,724,467 B2
(45) Date of Patent: May 25, 2010

(54) STORAGE DEVICE, CONTROL CIRCUIT FOR STORAGE DEVICE, AND SERVO-WRITE-MODE IDENTIFYING METHOD

(75) Inventors: Satoshi Yamashita, Kawasaki (JP); Kazuhiko Takaishi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/361,190

(22) Filed: Jan. 28, 2009

(65) Prior Publication Data

US 2009/0279200 A1 Nov. 12, 2009

(30) Foreign Application Priority Data

May 9, 2008 (JP) .............................. 2008-123954

(51) Int. Cl.
G11B 5/596 (2006.01)
(52) U.S. Cl. .................................................. 360/78.14
(58) Field of Classification Search .............. 360/78.14, 360/75, 77.04, 77.05, 31, 51, 48, 49
See application file for complete search history.

(56) References Cited

U.S. PATENT DOCUMENTS

| | | | |
|---|---|---|---|
| 4,809,091 A * | 2/1989 | Miyazawa et al. ............ | 360/48 |
| 5,293,276 A * | 3/1994 | Dunn et al. .................... | 360/51 |
| 6,034,835 A * | 3/2000 | Serrano .................... | 360/77.05 |
| 6,288,861 B1 * | 9/2001 | Blaum et al. ................... | 360/49 |
| 6,424,484 B1 * | 7/2002 | Ottesen et al. ................. | 360/75 |
| 6,614,607 B1 * | 9/2003 | Rothermel et al. ............ | 360/48 |
| 6,943,977 B2 * | 9/2005 | Yatsu .......................... | 360/75 |
| 6,995,942 B2 * | 2/2006 | Schmidt .................. | 360/77.04 |
| 7,012,773 B2 * | 3/2006 | Ashikaga et al. .............. | 360/48 |
| 7,019,933 B2 * | 3/2006 | Iseri et al. ..................... | 360/75 |
| 7,023,648 B2 * | 4/2006 | Mizukoshi .................... | 360/75 |
| 7,085,084 B2 * | 8/2006 | Yasuna et al. ................. | 360/51 |
| 7,233,453 B2 * | 6/2007 | Harada et al. ................. | 360/51 |
| 7,268,962 B2 * | 9/2007 | Sado ........................... | 360/31 |
| 7,477,472 B2 * | 1/2009 | Sado et al. ..................... | 360/75 |
| 2004/0264031 A1 * | 12/2004 | Yatsu .......................... | 360/75 |
| 2005/0128617 A1 * | 6/2005 | Kuroda et al. ................. | 360/16 |
| 2006/0126206 A1 * | 6/2006 | Takagi et al. .................. | 360/46 |
| 2006/0215306 A1 * | 9/2006 | Ehrlich et al. ................. | 360/75 |

FOREIGN PATENT DOCUMENTS

| | | |
|---|---|---|
| JP | A 2006-147104 | 6/2006 |
| JP | A 2006-221771 | 8/2006 |

* cited by examiner

*Primary Examiner*—Fred Tzeng
(74) *Attorney, Agent, or Firm*—Greer, Burns & Crain, Ltd.

(57) ABSTRACT

A servo-mark search control unit detects in a magnetic disk a servo mark matching a servo mark selected by a servo-mark candidate selecting unit. In this case, according to an instruction from a servo-mark search control unit, a non-volatile memory managing unit writes servo-write-mode identification information corresponding to the detected servo mark in a servo-write-mode identification-information storage unit of a non-volatile memory. In this manner, a magnetic disk device can recognize by itself a servo write mode with which servo patterns were written in a magnetic disk included in the magnetic disk device.

15 Claims, 19 Drawing Sheets

| SERVO-WRITE-MODE IDENTIFICATION ID (IDsw) | SERVO WRITE MODE | SERVO MARK |
|---|---|---|
| 1 | SELF STW | 1 Ch |
| 2 | STACK-MEDIA STW | 17 h |
| 3 | COPY STW | 14 h |
| 4 | MAGNETIC PRINTING | 12 h |

| SERVO-WRITE-MODE IDENTIFICATION ID (IDsw) | SERVO WRITE MODE | SHIFT AMOUNT |
|---|---|---|
| 1 | SELF STW | 0 |
| 2 | STACK-MEDIA STW | 2000 |
| 3 | COPY STW | 4000 |
| 4 | MAGNETIC PRINTING | 6000 |

| SERVO-WRITE-MODE IDENTIFICATION ID (IDsw) | SERVO WRITE MODE | PES FREQUENCY | PRIMARY ECCENTRIC AMOUNT | PRESENCE OF SURFACE WITH NO SERVO PATTERN WRITTEN |
|---|---|---|---|---|
| 1 | SELF STW | 4 kHz | 0 | NO |
| 2 | STACK-MEDIA STW | 3 kHz | 30 μm | NO |
| 3 | COPY STW | 3 kHz | 30 μm | YES |
| 4 | MAGNETIC PRINTING | 6 kHz | 30 μm | NO |

FIG.19

| SERVO WRITE MODE | CORRECTION OF PRIMARY ECCENTRIC AMOUNT | REPETITIVE CORRECTION | ZONE WIDTH | RRO NON-FOLLOWING |
|---|---|---|---|---|
| SELF STW | NOT REQUIRED | REQUIRED | NORMAL | NOT REQUIRED |
| STACK-MEDIA STW | REQUIRED | REQUIRED | FINE AROUND INNER PERIMETER | REQUIRED |
| COPY STW | REQUIRED | REQUIRED | FINE AROUND INNER PERIMETER | REQUIRED FOR SEED SURFACE |
| MAGNETIC PRINTING | REQUIRED | REQUIRED | FINE AROUND INNER AND OUTER PERIMETERS | REQUIRED |

FIG.20

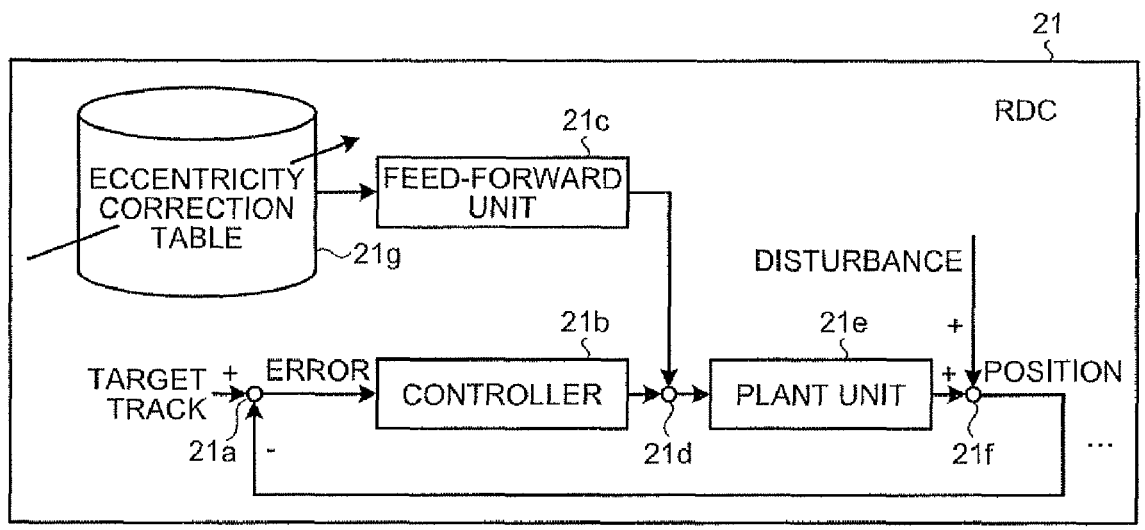

| SERVO WRITE MODE | SAME MEDIUM SEEK | DIFFERENT MEDIUM SEEK |
|---|---|---|
| SELF STW | HIGH SPEED | HIGH SPEED |
| STACK-MEDIA STW | HIGH SPEED | NORMAL |
| COPY STW | HIGH SPEED | HIGH SPEED |
| MAGNETIC PRINTING | NORMAL | NORMAL |

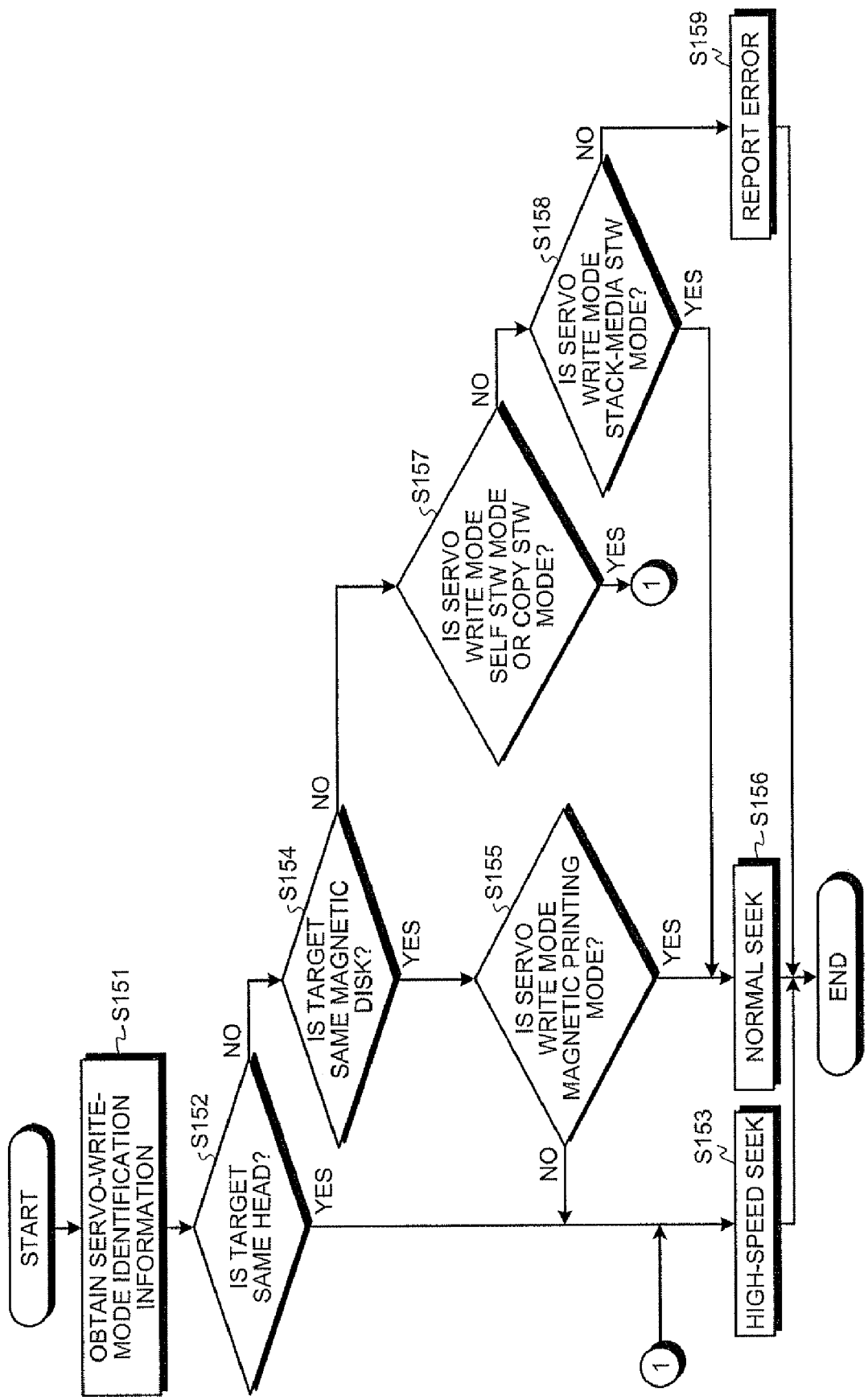

FIG.26

| SERVO WRITE MODE | SYMMETRY CORRECTION FF | VARIABLE EQ ADJUSTMENT |
|---|---|---|
| SELF STW | NOT REQUIRED | NOT REQUIRED |
| STACK-MEDIA STW | NOT REQUIRED | REQUIRED |
| COPY STW | NOT REQUIRED | REQUIRED FOR SEED SURFACE |
| MAGNETIC PRINTING | YES | REQUIRED |

STORAGE DEVICE, CONTROL CIRCUIT FOR STORAGE DEVICE, AND SERVO-WRITE-MODE IDENTIFYING METHOD

CROSS-REFERENCE TO RELATED APPLICATIONS

This application is based upon and claims the benefit of priority of the prior Japanese Patent Application No. 2008-123954, filed on May 9, 2008, the entire contents of which are incorporated herein by reference.

FIELD

The embodiments discussed herein are directed to a storage device, a control circuit for the storage device, and a servo-write-mode identifying method of identifying signal patterns that are called servo information (servo data) for use in servo control and is written in a storage medium incorporated in the storage device.

BACKGROUND

In recent years, demands for storage devices, such as magnetic disk devices, magneto-optical disk devices, and optical disk devices, are expanding. A storage device has incorporated therein a disk-shaped storage medium for reading and writing information via a head. With the expansion of demand for storage devices, information recording density of a storage medium has been significantly improved.

In such a high-density storage medium, to accurately position a head at a target track, auto control called servo control is used. In the storage medium, signal patterns called servo information (servo data) for use in servo control are written.

The servo information is written in the storage medium with a Servo Track Writer (STW) mode using a device called an STW (for example, a self STW mode, a stack-media STW mode, or a copy STW mode, which will be explained further below) or a magnetic printing mode. That is, from a plurality of modes of writing servo information, a manufacturer of the storage medium can arbitrarily use any one of the modes to write servo information in the storage medium.

However, each of these servo-information write modes has advantages and disadvantages in a storage-device manufacturing process. For example, the stack-media STW mode does not require much time to prepare for steps prior to a servo-information write process, allowing servo information to be written in approximately ten storage media at once, but do require much time to write servo information itself.

On the other hand, magnetic printing does not require much time to write servo information, allowing servo information to be written in a large number of storage media at once, but do require much time and cost to generate a model of servo patterns of servo information, which is called a master stamper.

Meanwhile, a manufacturer manufacturing storage devices is required to arrange a plan to produce storage devices in consideration of the number of orders for storage devices from customers and manufacturing yield of storage devices, and is also required to manage parts inventory. An increase in inventory due to excessive manufacturing of storage media is undesirable in view of manufacturing cost. Therefore, the entire manufacturing process from receiving an order for storage devices from a customer through generating servo patterns and then inspecting products before shipping to shipping them to the customer is desirably completed within the shortest possible period of time.

To do this, in consideration of the number of orders for storage devices from customers and manufacturing yield of storage devices, some or all of the servo-information write modes are combined as appropriate to write the servo information in the storage media. With this, production planning for optimizing the period of the entire manufacturing process can be achieved. That is, in one storage-device manufacturing process, storage devices with storage media having servo information written therein with different modes are produced in a mixed manner.

In general, when servo information is written with different modes, a shipping inspector has to recognize in advance which servo-information write mode was used to write the servo information in each storage medium and then perform an inspection process at the time of shipping according to the relevant mode.

However, when storage devices with servo information written therein with different modes are produced in a mixed manner in one storage-device manufacturing process due to the reasons, the servo-information write mode has to be correctly identified for each storage device so as to perform an inspection process at the time of shipping.

As a conventional technology of identifying a servo-information write mode, a storage device has been suggested in which a head that reads information stored in a storage medium selects from a plurality of types of servo information written in one storage medium is the one having the highest affinity for the characteristics of the head and capable of accurately reading information. Also, another storage device has been suggested in which a storage medium is provided with a protective area where information for identifying a device that has recorded servo information in the storage medium is stored. For example, these conventional technologies are disclosed in Japanese Laid-open Patent Publication Nos. 2006-147104 and 2006-221771.

However, in the conventional technologies mentioned above, in an inspection process at the time of shipping performed on a storage device with a storage medium incorporate therein, the inspector has to recognize in advance which servo-information write mode was used to write servo information and conduct an inspection by using an inspection program for each servo-information write mode.

Therefore, in the conventional technologies, in an inspection process, mixed presence of storage devices with different servo-information write modes is not allowed. That is, for each storage device with a different servo-information write mode, the inspection program has to be switched to a corresponding one, and such switching involves a temporary halt of the manufacturing line, thereby decreasing production efficiency.

Moreover, storage devices having storage media with servo information recorded therein with different servo-information write modes are operation-controlled by different control programs and are tested by different test programs. Therefore, different control programs have to be generated for the respective servo-information write modes, thereby inviting an increase in the number of processes for manufacturing storage devices and inhibiting a reduction in manufacturing cost and time of storage devices.

SUMMARY

According to an aspect of the invention, a storage device includes a servo-write-mode determining unit that determines which servo write mode is used to write servo information in a storage medium of the storage device; and an identification-information storage unit that stores identification information for identifying the servo write mode determined by the servo-write-mode determining unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a drawing of characteristics of servo control for each servo-pattern generating scheme;

FIG. 20 is a drawing of the configuration of a servo control block of a read channel for eccentricity correction;

FIG. 23 is a flowchart of a seek-mode selecting process;

FIG. 26 is a drawing as to whether symmetry correction FF and variable EQ adjustment are required for each servo-pattern generating scheme.

DESCRIPTION OF EMBODIMENTS

Preferred embodiments of the present invention will be explained with reference to accompanying drawings. Here, in first to fourth embodiments, although a storage medium is taken as a magnetic disk and the storage device is taken as a magnetic disk device, this is not meant to be restrictive, and the present invention can be applied to other storage media and disk devices, such as an optical disk and an optical disk device, or a magneto-optical disk and a magnet-optical disk device.

Figure 1:
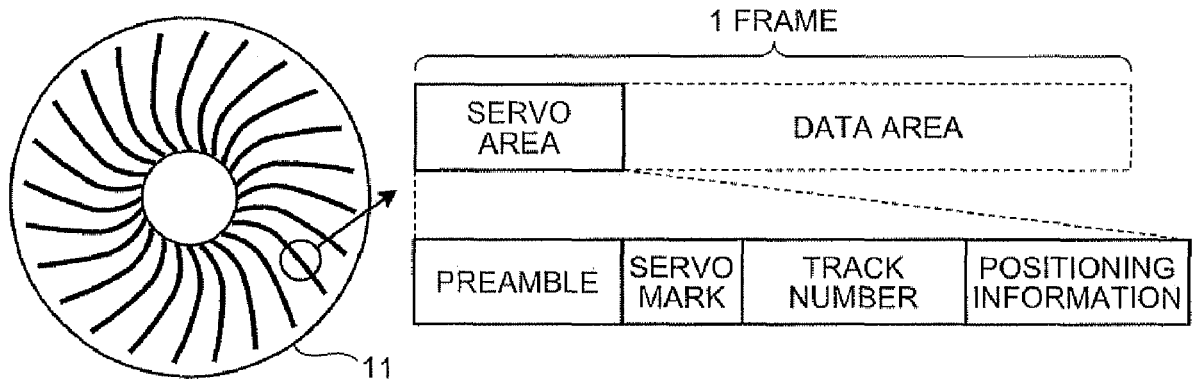
FIG. 1 is a drawing for explaining servo information written in a magnetic disk.

First, prior to explanation of the embodiments, servo information of the magnetic disk and a magnetic-disk-device manufacturing process are explained, which are assumed in the embodiments. FIG. 1 is a drawing for explaining servo information written in the magnetic disk.

FIG. 1 is a schematic drawing of servo information patterned on the surface of a magnetic disk 11 accommodated in a magnetic-disk accommodation space inside of a magnetic disk device. The servo information is used for positioning control of positioning a magnetic head. As depicted in the drawing, the magnetic disk 11 has recorded therein servo information extending in an arc shape in a radial direction from the center of rotation as a plurality of servo patterns.

As depicted in FIG. 1, on the surface of the magnetic disk 11, the servo patterns are disposed equally spaced apart from each other as arcs along the radial direction from the center to the outer perimeter of the magnetic disk 11. Each servo pattern takes an arc shape because of the following reason. That is, a head actuator having mounted thereon a floating head slider with a magnetic head attached at the tip fluctuates by taking a center axis of a spindle as a rotation axis. For this reason, when the magnetic head traces a servo pattern between both ends thereof, each servo pattern takes an arc shape so that a distance from the center axis to the magnetic head is kept constant.

The servo information recorded in such servo patterns includes a plurality of frames. As depicted in FIG. 1, servo information of one frame includes a servo area and a data area. The servo area further includes a preamble, a servo mark, a track number, and positioning information. The servo mark, which is represented by, for example, a double-digit hexadecimal number, is identification information indicating that the frame is a frame of servo information.

Figure 2:
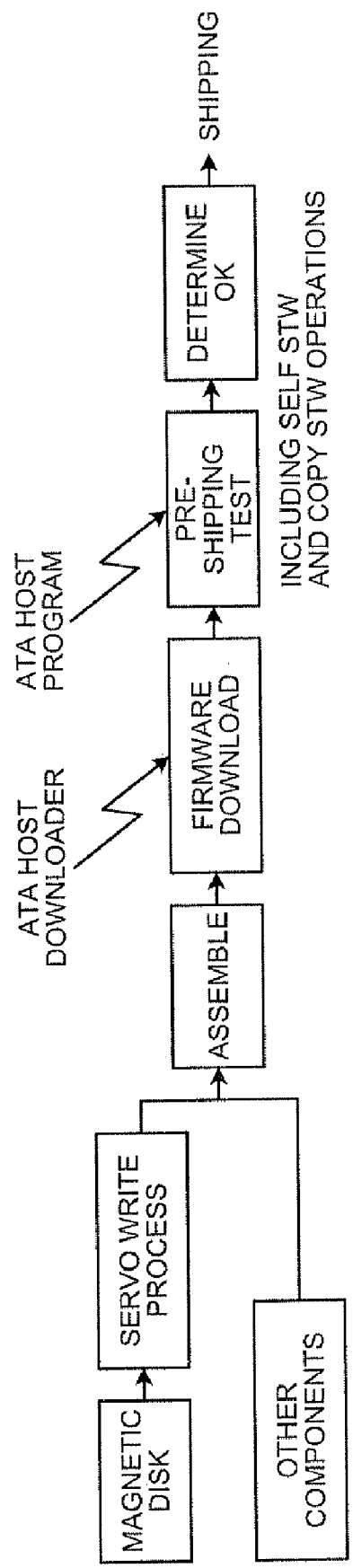
FIG. 2 is a drawing for explaining a general outline of a process of manufacturing a magnetic disk device.

FIG. 2 is a drawing for explaining a general outline of a process of manufacturing a magnetic disk device. As depicted in FIG. 2, a servo write process of writing servo patterns in a magnetic disk is performed, and then the magnetic disk is assembled together with other components.

Here, servo write modes for writing servo patterns in a magnetic disk include a self STW mode, a stack-media STW mode, a copy STW mode, and a magnetic printing mode. The self STW mode is a mode for writing servo patterns with the magnetic head of the magnetic disk device itself.

The stack-media STW mode is a mode for writing servo patterns simultaneously in a plurality of magnetic disks by utilizing a dedicate STW device. The copy STW mode is a mode as follows. First, before a set of a plurality magnetic disks is incorporated in a magnetic disk device, servo patterns are written in one entire surface of one of the magnetic disks.

Then, while positioning control is performed with the servo patterns written in the disk with servo pattern written therein, a Repeatable Run Out (RRO) correction value is measured. By using this RRO correction value, servo patterns are written in one surface of each magnetic disk having servo pattern not yet written therein. Here, RRO is a rotation synchronization component of eccentricity, which is positional disturbance occurring due to vibrations of rotation of a spindle motor.

The magnetic printing mode is a mode for generating in advance a master stamper, which is a model of servo patterns, and pressing the master stamper to a magnetic disk to apply a magnetic field, thereby printing the servo patterns of the master stamper to the magnetic disk.

Then, for example, from an Advanced Technology Attachment (ATA) host computer connected via an interface complying with ATA standards to the magnetic disk device, firmware for controlling circuits and devices of the magnetic disk device and a test program for a pre-shipping test, which will be explained further below, are downloaded. The downloaded firmware and test program will be written in a non-volatile memory (for example, a flash memory) of a Micro Controller Unit (MCU) included in the magnetic disk device.

To the magnetic disk device manufactured in this manner, a pre-shipping test is performed. In the pre-shipping test, the test program is executed in the magnetic disk device, testing calibration by the magnetic disk device itself, write of test data in the magnetic disk, read of the written test data, deletion of the written test data, and others.

Here, when the servo write mode of the magnetic disk is the self STW or the copy STW, as a pre-stage process of the pre-shipping test, a servo write process is performed. Then, only the magnetic disks that passed the pre-shipping test will be shipped.

[a] First Embodiment

With reference to FIGS. 3 to 6, a first embodiment is explained. In the first embodiment, servo mark information indicative of a correspondence among a servo write mode, identification information of the servo write mode, and a servo mark included in servo mark information is prepared in advance. Then, when a servo mark matching the servo mark in the servo mark information is detected in the magnetic disk 11, the servo-write identification information corresponding to the detected servo mark is stored in a non-volatile memory 23 in a magnetic disk device 100a.

Figure 3:
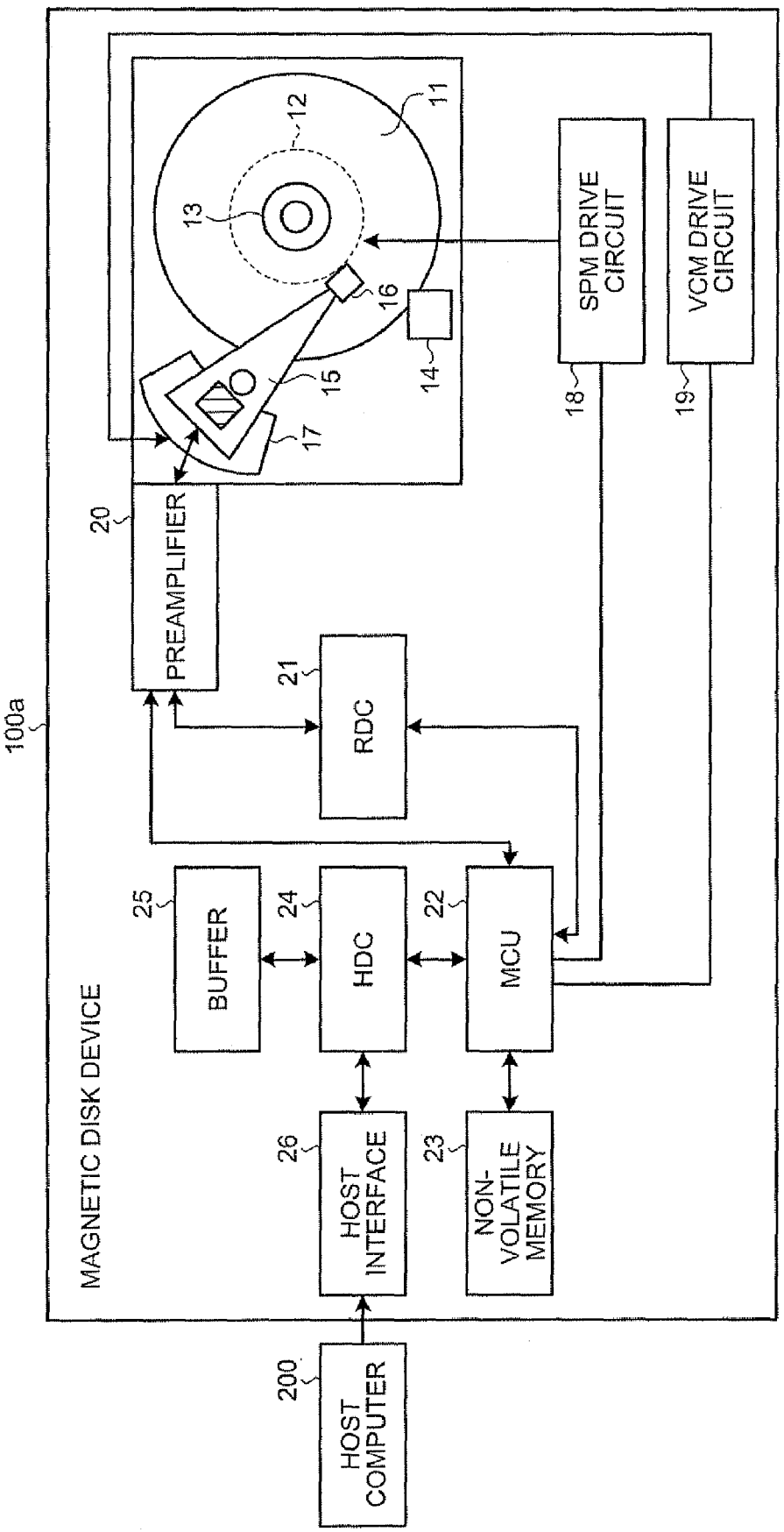
FIG. 3 is a block diagram of the configuration of a magnetic disk device according to a first embodiment.

FIG. 3 is a block diagram of the configuration of a magnetic disk device according to the first embodiment. As depicted in the drawing, the magnetic disk device 100a according to the first embodiment includes the magnetic disk 11, a Spindle Motor (SPM) 12 that rotates the magnetic disk 11 about a rotation axis, an inner stopper 13, an outer stopper 14, a head actuator 15, a magnetic head 16 mounted at the tip of the head actuator 15, and a Voice Coil Motor (VCM) 17.

Also, the magnetic disk device 100a includes a SPM drive circuit 18 that drives the SPM 12 and a VCM drive circuit 19 that drives the VCM 17. Also, the magnetic disk device 100a includes a preamplifier 20 that amplifies a signal read from the magnetic disk 11 and a signal to be written in the magnetic disk 11 by the magnetic head 16, and a Read Write Channel (RWC) 21 that encodes information to be written in the magnetic disk 11 and decodes the signal read from the magnetic disk 11.

Furthermore, the magnetic disk device 100a includes a Micro Controller Unit (MCU) 22 for controlling the magnetic disk device and the rewritable non-volatile memory 23 connected to the MCU 22. Still further, the magnetic disk device 100a includes a Hard Disk Controller (HDC) 24 for error correction of data for transmission and reception with a host computer 200 of the magnetic disk device 100a, a buffer 25 that buffers data for transmission and reception by the HDC 24 with the host computer 200, and a host interface 26, which is a connection interface with the host computer 200.

Figures 4, 5:
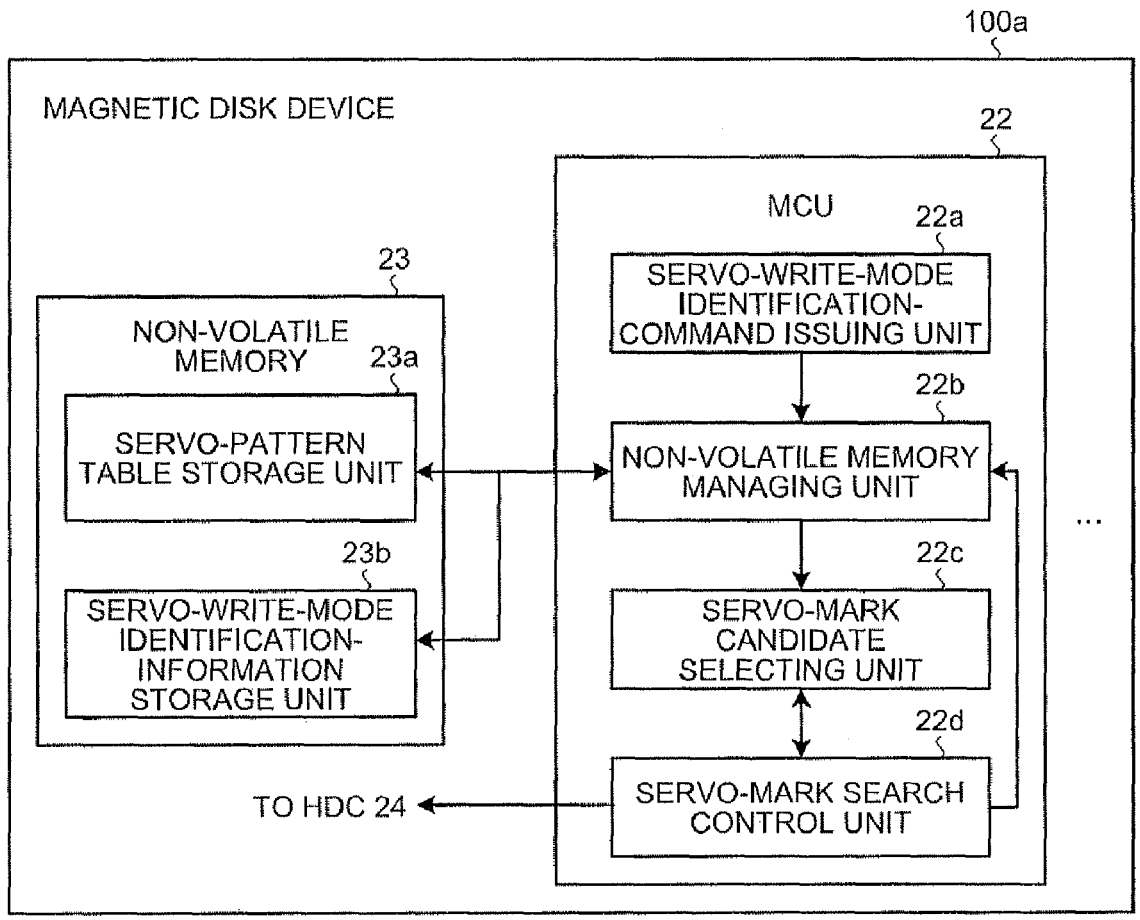
FIG. 4 is a functional block diagram of the configuration of an MCU of the magnetic disk device according to the first embodiment.
FIG. 5 is a drawing of a servo pattern table according to the first embodiment.

Next, the configuration of the MCU of the magnetic disk device according to the first embodiment is explained. FIG. 4 is a functional block diagram of the configuration of the MCU of the magnetic disk device according to the first embodiment. Here, in the magnetic disk device 100a depicted in the drawing, components other than the MCU 22 and the non-volatile memory 23 are omitted.

The MCU 22 includes a servo-write-mode identification-command issuing unit 22a, a non-volatile memory managing unit 22b, a servo-mark candidate selecting unit 22c, and a servo-mark search control unit 22d. The non-volatile memory 23 includes a servo-pattern table storage unit 23a and a servo-write-mode identification-information storage unit 23b.

The servo-write-mode identification-command issuing unit 22a issues a servo-write-mode identification command for instructing the non-volatile memory managing unit 22b to read servo patterns from a servo pattern table and forwards them to the servo-mark candidate selecting unit 22c.

The non-volatile memory managing unit 22b accepts the servo-write-mode identification command issued by the servo-write-mode identification-command issuing unit 22a. Then, the non-volatile memory managing unit 22b reads servo marks from the servo pattern table (refer to FIG. 5) stored in the servo-pattern-table storage unit 23a of the non-volatile memory 23 and then forwards them to the servo-mark candidate selecting unit 22c.

The servo-mark candidate selecting unit 22c selects one servo mark from the servo patterns forwarded from the non-volatile memory managing unit 22b as a servo mark candidate written in the magnetic disk 11, and instructs the servo-mark search control unit 22d to try to detect in the magnetic disk 11 a servo mark matching the selected servo mark.

The servo-mark search control unit 22d searches the entire surface of the magnetic disk 11 for a servo mark matching the servo mark selected by the servo-mark candidate selecting unit 22c, with the rotation of the magnetic disk 11 by the rotation of the SPM 12 and the fluctuations of the head actuator 15.

Then, the servo-mark search control unit 22d detects in the magnetic disk 11 the servo mark matching the servo mark selected by the servo-mark candidate selecting unit 22c. In this case, an instruction is issued to the non-volatile memory managing unit 22b for writing a servo-write-mode identification information corresponding to the detected servo mark in the servo-write-mode identification-information storage unit 23b of the non-volatile memory 23.

The non-volatile memory managing unit 22b receives the instruction from the servo-mark search control unit 22d for writing the servo-write mode identification information. Then, the non-volatile memory managing unit 22b writes the servo-write-mode identification information corresponding to the servo mark matching the servo mark detected by the servo-mark candidate selecting unit 22c in the servo-write-mode identification-information storage unit 23b of the non-volatile memory 23.

Next, the servo pattern table according to the first embodiment is explained. FIG. 5 is a drawing of the servo pattern table according to the first embodiment. As depicted in the drawing, the servo pattern table includes columns of "servo-write-mode identification ID (IDsw)" indicative of identification information of the servo write mode, "servo write mode" indicative of a name of the servo write mode, and "servo mark" indicative of a servo mark value as a double-digit hexadecimal number. Here, an entry in the servo pattern table is called a "servo pattern".

With reference to FIG. 5, for example, a "servo write mode" with a "servo-write-mode identification ID" of "1" is the "self STW", and its "servo mark" is "1Ch". Similarly, for example, a "servo write mode" with a "servo-write-mode identification ID" of "2" is the "stack-media STW" mode, and its "servo mark" is "17h"; a "servo write mode" with a "servo-write-mode identification ID" of "3" is the "copy STW" mode, and its "servo mark" is "14h"; and a "servo write mode" with a "servo-write-mode identification ID" of "4" is the "magnetic printing" mode, and its "servo mark" is "12h".

Figure 6:
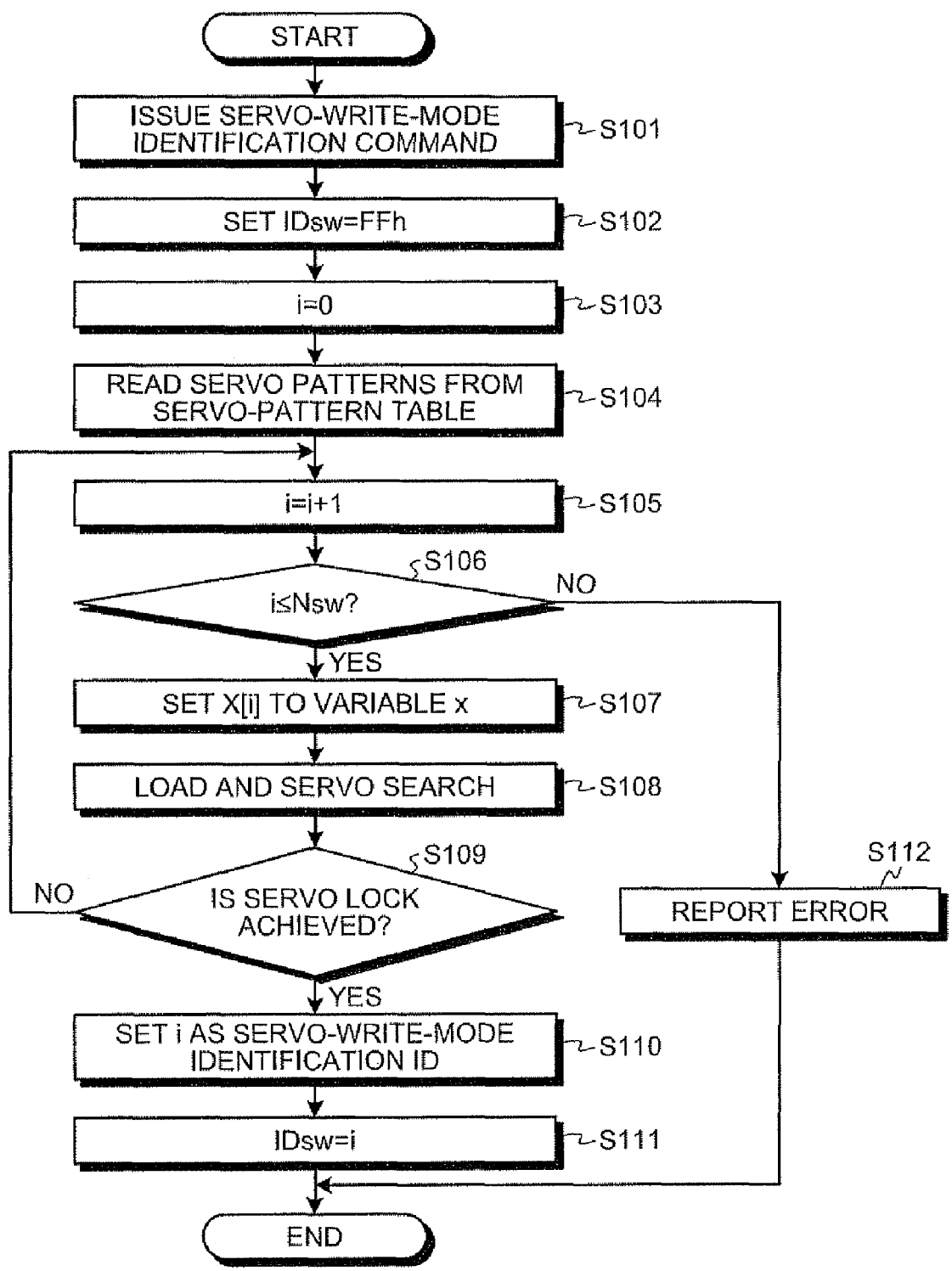
FIG. 6 is a flowchart of a servo-write-mode identifying process according to the first embodiment.

Next, a servo-write-mode identifying process according to the first embodiment is explained. FIG. 6 is a flowchart of a servo-write-mode identifying process performed by the MCU 22 of the magnetic disk device 100a according to the first embodiment.

Here, the servo-write-mode identifying process is performed at the time of shipping inspection of the magnetic disk device 100a. The servo-write-mode identifying process is executed immediately after a test program for shipping inspection. Here, the test program is a general test program not depending on the servo write mode because the magnetic disk device 100a itself identifies the servo write mode of the magnetic disk 11 mounted thereon.

Also, at the time of shipping inspection including the servo-write-mode identifying process, the host computer 200 connected to the magnetic disk device 100a is a host computer for shipping inspection that executes the shipping-inspection program.

As depicted in FIG. 6, first at step S101, the servo-write-mode identification-command issuing unit 22a issues a servo-write-mode identification command. Then at step S102, to initialize the servo-write-mode identification-information storage unit 23b of the non-volatile memory 23, the non-volatile memory managing unit 22b writes a hexadecimal number "FFh" in "IDsw", which is a setting parameter of the servo-write-mode identification information. Then at step S103, the servo-mark candidate selecting unit 22c sets "0" to an index variable "i" for use in the MCU 22 for initialization.

Then at step S104, the non-volatile memory managing unit 22b reads all servo patterns from the servo pattern table. At this time, the number of servo patterns is counted and set to a setting parameter "Nsw" managed in the MCU 22. Also, to a matrix X[i](1≦i≦Nsw) of the setting parameter with a size of "Nsw" managed in the MCU 22, each value of the "servo mark" corresponding to a servo-write-mode identification ID "i" is set.

Then at step S105, the servo-mark candidate selecting unit 22c adds "1" to the index variable "i". Then at step S106, the servo-mark candidate selecting unit 22c determines whether "i≦Nsw" holds. When it is determined that "i≦Nsw" holds ("Yes" at step S106), the procedure goes to step S107. When it is not determined that "i≦Nsw" holds ("No" at step S106), the procedure goes to step S112.

Then at step S107, the servo-mark candidate selecting unit 22c sets "X[i]" to a variable "x" indicative of a servo mark candidate and managed in the MCU 22. Then at step S108, the servo-mark search control unit 22d causes the magnetic head 16 to be loaded for searching the entire surface of the magnetic disk 11 for a servo mark of "x=X[i]".

Then at step S109, the servo-mark search control unit 22d determines whether a servo lock is achieved. The servo lock means that servo-mark demodulation is successful consecutively for a predetermined number of times. When it is determined that a servo lock is achieved ("Yes" at step S109), the procedure goes to step S110. When it is not determined that a servo lock is achieved ("No" at step S109), the procedure goes to step S105.

Then at step S110, the servo-mark search control unit 22d takes "i" at the servo lock as a servo-write-mode identification ID corresponding to the servo mark of the search result. Then at step S111, the non-volatile memory managing unit 22b writes "i" taken as the servo-write-mode identification ID at step S109 in "IDsw" of the servo-write-mode identification-information storage unit 23b in the non-volatile memory 23.

On the other hand, at step S112, the servo-mark search control unit 22d reports an error to the HDC 24. The error report is then reported from the HDC 24 to the host computer 200.

According to the first embodiment, the magnetic disk device 100a can recognize which servo write mode was used to write the servo patterns in the magnetic disk 11 of the magnetic disk device 100a. Therefore, even if a magnetic disk device having a magnetic disk with servo patterns written therein with a different servo write mode is mixed in the manufacturing process, the test at the time of shipping can be performed with a single-design test program in the same manufacturing process.

Also, a magnetic disk device having a magnetic disk with servo patterns written therein with a different servo write mode can be controlled with single-design firmware (a control program of the magnetic disk device). Therefore, the number of processes of the firmware or test program can be significantly reduced.

[b] Second Embodiment

Figure 7:
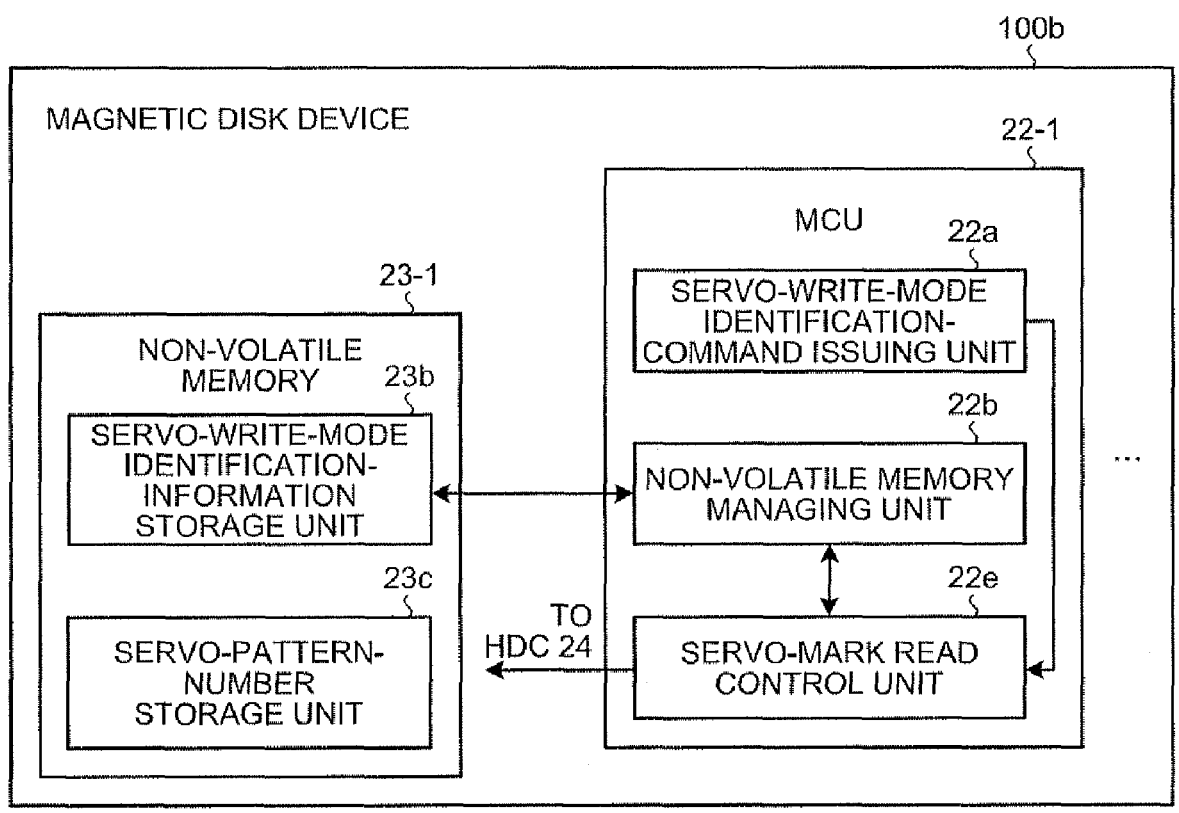
FIG. 7 is a functional block diagram of the configuration of an MCU of a magnetic disk device according to a second embodiment.
Figure 8:
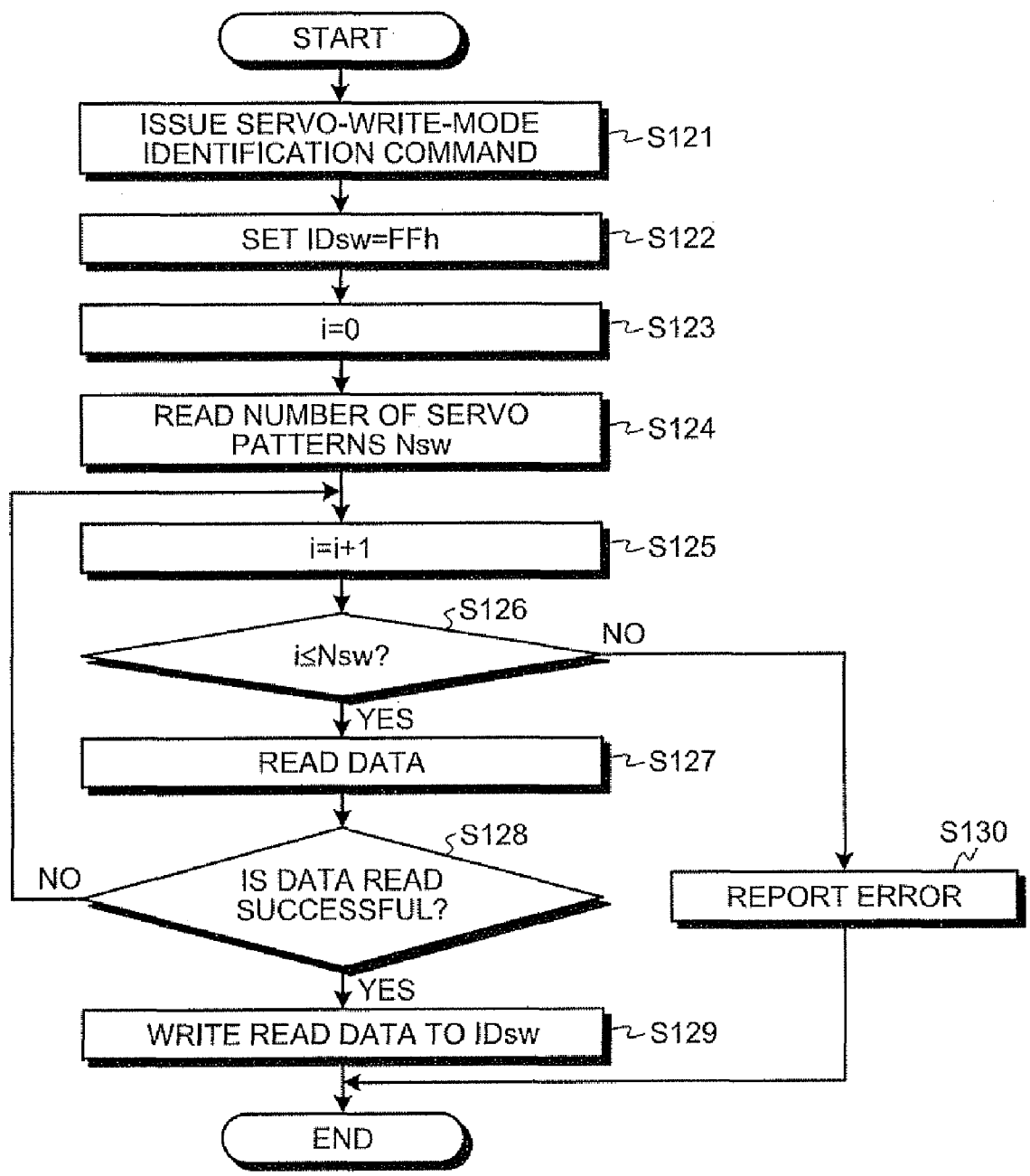
FIG. 8 is a flowchart of a servo-write-mode identifying process according to the second embodiment.

With reference to FIGS. 7 and 8, a second embodiment is explained. In the second embodiment, servo-write-mode identification information written in the magnetic disk 11 is read and stored in the non-volatile memory 23. Note that only the part different from the first embodiment is explained in the second embodiment.

FIG. 7 is a functional block diagram of the configuration of an MCU of a magnetic disk device according to the second embodiment. In the second embodiment, it is assumed that a different piece of servo-write-mode identification information is written for each servo write mode in a specific track of the magnetic disk 11.

As depicted in the drawing, an MCU 22-1 of a magnetic disk device 100b according to the second embodiment includes the servo-write-mode identification-command issuing unit 22a, the non-volatile memory managing unit 22b, and a servo-mark read control unit 22e. Also, a non-volatile memory 23-1 of the magnetic disk device 100b according to the second embodiment includes the servo-write-mode identification-information storage unit 23b and a servo-pattern-number storage unit 23c having the number of servo patterns stored therein in advance.

Upon accepting a servo-write-mode identification command issued by the servo-write-mode identification-command issuing unit 22a, the servo-mark read control unit 22e causes the magnetic head 16 to be loaded and positioned at a specific track of the magnetic disk 11. Then, at that specific track, the servo-mark read control unit 22e reads servo-write-mode identification information written therein.

The servo-mark read control unit 22e causes the servo-write-mode identification information successfully read at the specific track to be stored in the servo-write-mode identification-information storage unit 23b of the non-volatile memory 23-1 via the non-volatile memory managing unit 22b.

Next, a servo-write-mode identifying process according to the second embodiment is explained. FIG. 8 is a flowchart of a servo-write-mode identifying process performed by the MCU 22-1 of the magnetic disk device 100b according to the second embodiment.

As depicted in FIG. 8, first at step S121, the servo-write-mode identification-command issuing unit 22a issues a servo-write-mode identification command. Then at step S122, to initialize the servo-write-mode identification-information storage unit 23b of the non-volatile memory 23, the non-volatile memory managing unit 22b writes a hexadecimal number "FFh" in "IDsw", which is a setting parameter of the servo-write-mode identification information. Then at step S123, the servo-mark read control unit 22e sets "0" to an index variable "i" for use in the MCU 22-1 for initialization.

Then at step S124, the non-volatile memory managing unit 22b reads a number of servo pattern "Nsw" from the servo-pattern-number storage unit 23c. Then at step S125, the servo-mark read control unit 22e adds "1" to the index variable "i". Then at step S126, the servo-mark read control unit 22e determines whether "i≦Nsw" holds. When it is determined that "i≦Nsw" holds ("Yes" at step S126) the procedure goes to step S127. When it is not determined that "i≦Nsw" holds ("No" at step S126), the procedure goes to step S130.

Then at step S127, the servo-mark read control unit 22e positions the magnetic head 16 at a specific track of the magnetic disk 11 to try to read data. Then at step S128, the servo-mark read control unit 22e determines whether data read is successful. Successful data read means that read-data demodulation is successful consecutively for a predetermined number of times.

When it is determined that data read is successful ("Yes" at step S128), the procedure goes to step S129. When it is not determined that data read is successful ("No" at step S128), the procedure goes to step S125. At step S129, the non-volatile memory managing unit 22b writes the successfully-read data in "IDsw" of the servo-write-mode identification-information storage unit 23b in the non-volatile memory 23.

On the other hand, at step S130, the servo-mark read control unit 22e reports an error to the HDC 24. The error report is then reported from the HDC 24 to the host computer 200.

According to the second embodiment, a servo pattern table is not required to be prepared in advance. Therefore, the non-volatile memory can be made compact, thereby reducing parts cost.

[c] Third Embodiment

With reference to FIGS. 9 to 13, a third embodiment is explained. In the third embodiment, a plurality of the magnetic heads 16 simultaneously moving to the same track of the storage medium are positioned at a specific track position. At that specific track position, an average of track numbers obtained via the magnetic heads 16 is calculated. Then, a servo write mode is determined whose offset amount is equal to a difference the average of the specific track numbers and a reference track number. Note that, as with the second embodiment, only the part different from the first embodiment is explained in the third embodiment.

Figure 9:
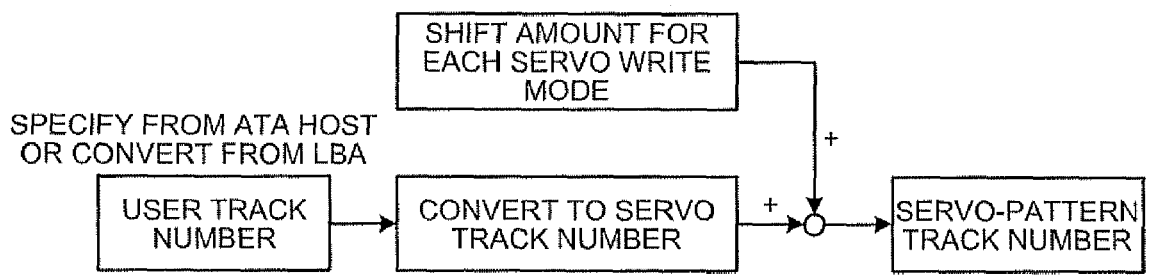
FIG. 9 is a drawing for explaining a correspondence of track numbers according to a third embodiment.

FIG. 9 is a drawing for explaining a correspondence of track numbers according to the third embodiment. As depicted in the drawing, in the third embodiment, for each servo write mode, a track for write is shifted to identify servo information. As depicted in FIG. 9, a track number obtained by adding a track shift amount for each servo write to a value obtained by converting a track number of user data specified by an ATA host or Logical Block Address (LBA) (user track number) to a servo track number is taken as a servo-pattern track number.

Figure 10:
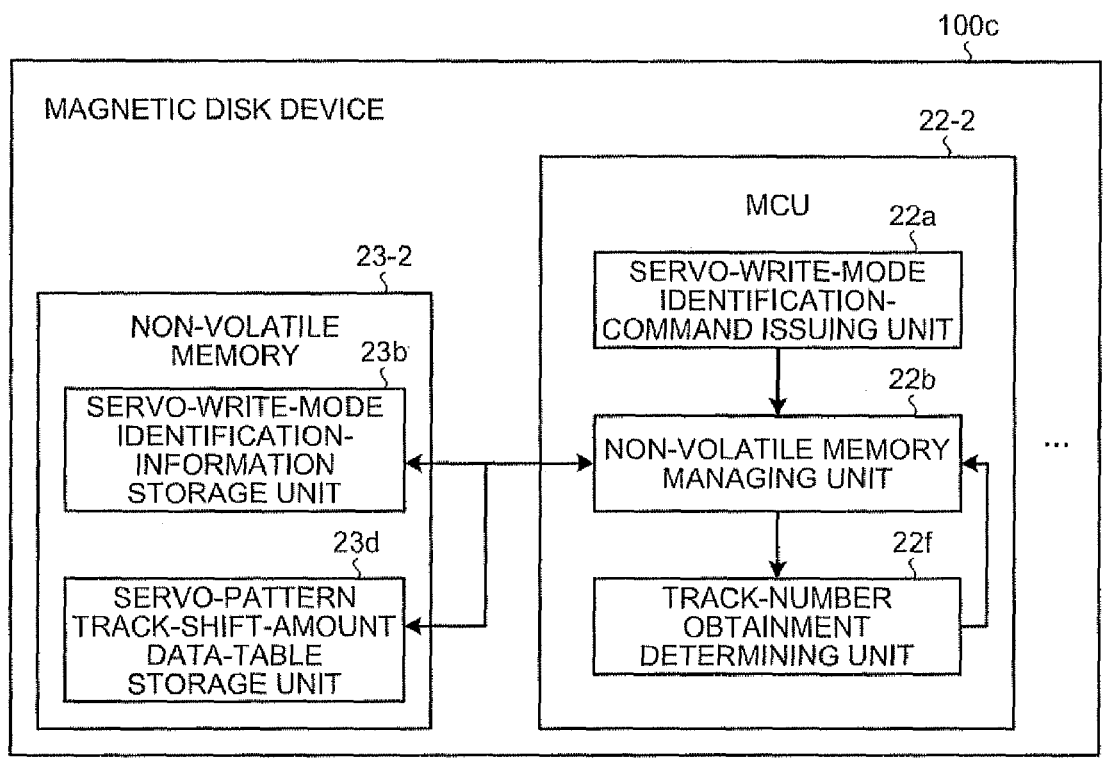
FIG. 10 is a functional block diagram of the configuration of an MCU of a magnetic disk device according to the third embodiment.

Next, the configuration of an MCU of a magnetic disk device according to the third embodiment is explained. FIG. 10 is a functional block diagram of the configuration of the MCU of the magnetic disk device according to the third embodiment.

As depicted in the drawing, an MCU 22-2 of a magnetic disk device 100c according to the third embodiment includes the servo-write-mode identification-command issuing unit 22a, the non-volatile memory managing unit 22b, and a track-number obtainment determining unit 22f.

Also, a non-volatile memory 23-2 of the magnetic disk device 100c according to the third embodiment includes the servo-write-mode identification-information storage unit 23b and a servo-pattern track-shift-amount data-table storage unit 23d having stored therein a servo-pattern track-shift-amount data table storing a different shift amount of a write track from a reference value for each servo pattern.

The non-volatile memory managing unit 22b accepts a servo-write-mode identification command issued by the servo-write-mode identification-command issuing unit 22a. Then, from the servo-pattern track-shift-amount data table (refer to FIG. 11) stored in the servo-pattern track-shift-amount data-table storage unit 23d of the non-volatile memory 23, a shift amount different for each servo write mode is read and forwarded to the track-number obtainment determining unit 22f.

The track-number obtainment determining unit 22f obtains all track numbers of the magnetic disk 11 at track positions where the magnetic head 16 is made in contact with the inner stopper 13 to calculate an average of the track numbers. Then, a difference between the average and the reference value is calculated. Then, a range of the shift amount different for each servo write mode, the range to which the difference between the average of the track numbers and the reference number belongs, is determined, thereby identifying the servo write mode.

Then, the track-number obtainment determining unit 22f instructs the non-volatile memory managing unit 22b to set the corresponding identification information different for each determined servo write mode to "IDsw" of the servo-wrote-mode identification-information storage unit 23b.

Figures 11, 12:
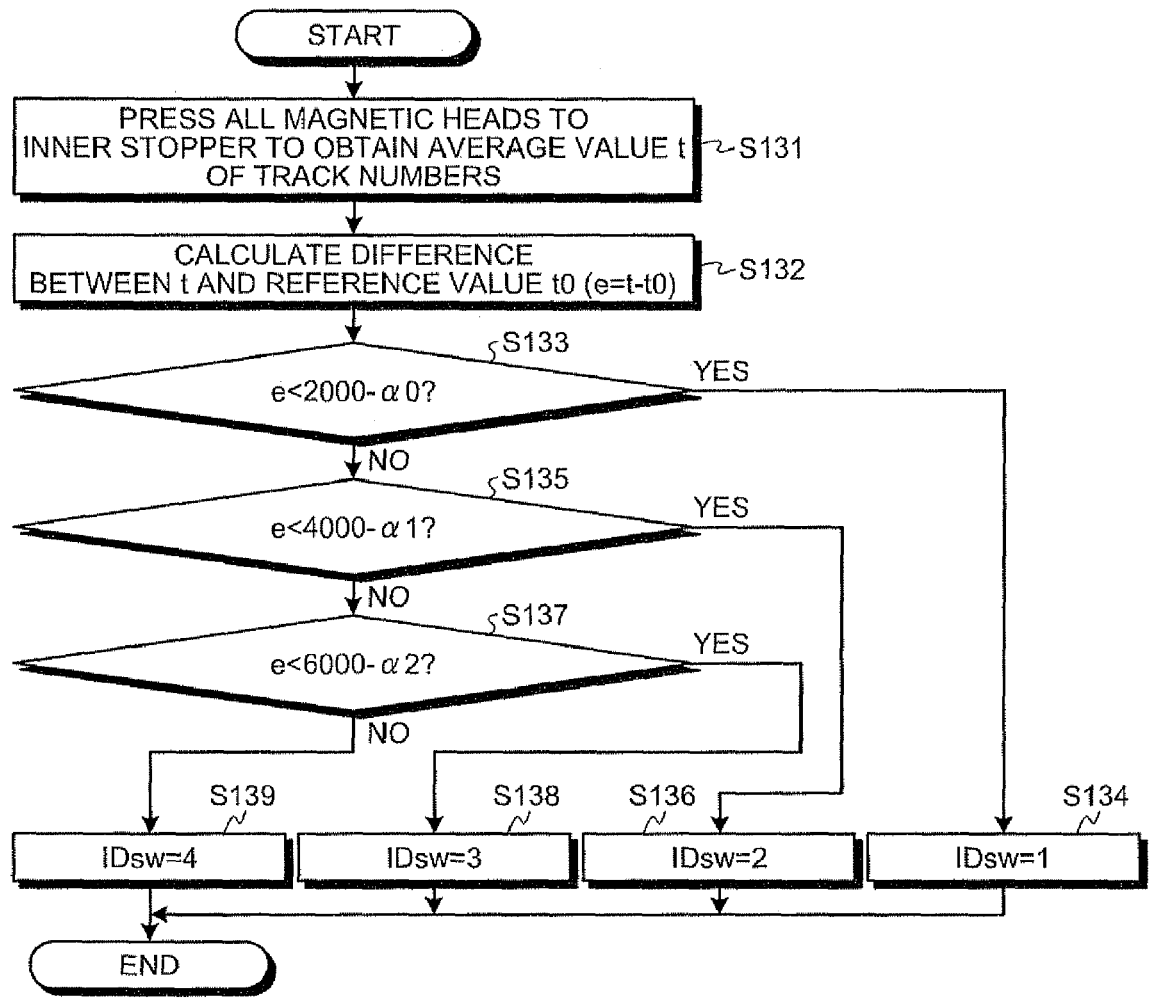
FIG. 11 is a drawing of a servo-pattern track-shift-amount data table according to the third embodiment.
FIG. 12 is a flowchart of a servo-write-mode identifying process according to the third embodiment.

Next, the servo-pattern track-shift-amount data table according to the third embodiment is explained. FIG. 11 is a drawing of the servo-pattern track-shift-amount data table according to the third embodiment.

As depicted in FIG. 11, the servo-pattern track-shift-amount data table includes columns of "servo-write-mode identification ID (IDsw)" indicative of identification information of the servo write mode, "servo write mode" indicative of a name of the servo write mode, and "shift amount" indicative of a shift amount of a write track number of the servo pattern different for each servo write mode. Here, an entry in the servo-pattern track-shift-amount data table is called a "servo pattern".

With reference to FIG. 11, for example, a "servo write mode" with a "servo-write-mode identification ID" of "1" is the "self STW", and its "shift amount" is "0". That is, the shift amount of the servo pattern written with the "self STW" serves as a reference value of the shift amount.

Similarly, for example, a "servo write mode" with a "servo-write-mode identification ID" of "2" is the "stack-media STW" mode, and its "shift amount" is "2000"; a "servo write mode" with a "servo-write-mode identification ID" of "3" is the "copy STW" mode, and its "shift amount" is "4000"; and a "servo write mode" with a "servo-write-mode identification ID" of "4" is the "magnetic printing" mode, and its "shift amount" is "6000".

Next, a servo-write-mode identifying process according to the third embodiment is explained. FIG. 12 is a flowchart of a servo-write-mode identifying process according to the third embodiment. As depicted in the drawing, first at step S131, the track-number obtainment determining unit 22*f* presses all of the magnetic heads 16 to the inner stopper 13 to obtain an average value t of all track numbers of the magnetic disk 11.

The track-number obtainment determining unit 22*f* then calculates a difference between t obtained at step S131 and a reference value t0($e=t-t0$). Then at step S133, the track-number obtainment determining unit 22*f* determines whether the difference e calculated at step S132 is smaller than "2000−α0". Here, "α0" is a correction value of the track shift amount in consideration of measurement error of the difference e.

When it is determined that the difference e is smaller than "2000−α0" ("Yes" at step S133), the procedure goes to step S134. When it is not determined that the difference e is smaller than "2000−α0" ("No" at step S133), the procedure goes to step S135. At step S134, the track-number obtainment determining unit 22*f* determines that the servo write mode is the "self STW" mode, and instructs the non-volatile memory managing unit 22*b* to set "1" to "IDsw" in the servo-write-mode identification-information storage unit 23*b*.

At step S135, the track-number obtainment determining unit 22*f* determines whether the difference e calculated at step S132 is smaller than "4000−α1". Here, "α1" is a correction value of the track shift amount in consideration of measurement error of the difference e. When it is determined that the difference e calculated at step S132 is smaller than "4000−α1" ("Yes" at step S135), the procedure goes to step S136. When it is not determined that the difference e calculated at step S132 is smaller than "4000−α1" ("No" at step S135), the procedure goes to step S137.

At step S136, the track-number obtainment determining unit 22*f* determines that the servo write mode is the "stack-media STW" mode, and instructs the non-volatile memory managing unit 22*b* to set "2" to "IDsw" in the servo-write-mode identification-information storage unit 23*b*.

At step S137, the track-number obtainment determining unit 22*f* determines whether the difference e calculated at step S132 is smaller than "6000−α2". Here, "α2" is a correction value of the track shift amount in consideration of measurement error of the difference e. When it is determined that the difference e calculated at step S132 is smaller than "6000−α2" ("Yes" at step S137), the procedure goes to step S138. When it is not determined that the difference e calculated at step S132 is smaller than "6000−α2" ("No" at step S137), the procedure goes to step S139.

At step S138, the track-number obtainment determining unit 22*f* determines that the servo write mode is the "copy STW" mode, and instructs the non-volatile memory managing unit 22*b* to set "3" to "IDsw" in the servo-write-mode identification-information storage unit 23*b*.

Also at step S139, the track-number obtainment determining unit 22*f* determines that the servo write mode is the "magnetic printing" mode, and instructs the non-volatile memory managing unit 22*b* to set "4" to "IDsw" in the servo-write-mode identification-information storage unit 23*b*.

Figure 13:
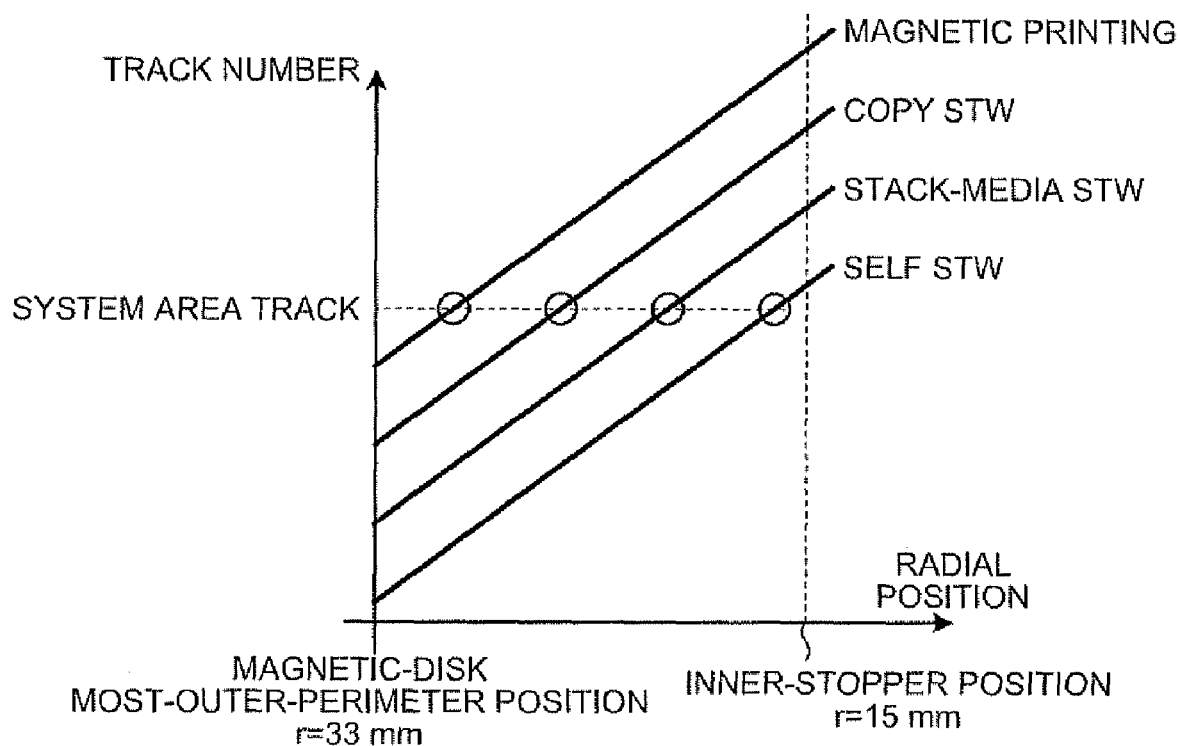
FIG. 13 is a drawing for explaining a correspondence of servo-information write radial positions for each servo-pattern generating scheme according to the third embodiment.

Next, a correspondence of servo-information write radial positions for each servo-pattern generating scheme according to the third embodiment is explained. FIG. 13 is a drawing for explaining a correspondence of servo-information write radial positions for each servo-pattern generating scheme according to the third embodiment.

As depicted in FIG. 13, for example, it is assumed that a most-outer-perimeter radial position r of the magnetic disk 11 is 33 millimeters and a radial position r of the inner stopper 13 is 15 millimeters. In this case, servo patterns are written according to the self STW mode, the stack-media STW mode, the copy STW mode, and then the magnetic printing mode at positions in a decreasing order of the track number.

With this, at the radial position of the inner stopper, a track number according to the servo write mode is assigned to the write position of the servo pattern. Also, the position where a system area allocated at the track position with a specific track number is disposed varies for each servo write mode.

Here, in the third embodiment, without the servo-write-mode identification-information storage unit 23*b* being provided to the non-volatile memory 23-2, the servo-write-mode identification information may be written in the system area allocated at the track position with the specific track number. With this, the resources of the non-volatile memory 23-2 can be made compact, thereby suppressing parts cost of the magnetic disk device 100*c*.

Also, if the system area has stored therein a servo-pattern track-shift-amount data table, the non-volatile memory 23-2 itself is not required. Therefore, parts cost of the magnetic disk device 100*c* can be suppressed, and the manufacturing process can be simplified, thereby reducing manufacturing cost.

According to the third embodiment, only the number of servo patters can be prepared and stored in advance. Therefore, the non-volatile memory can be made compact, thereby reducing parts cost.

[d] Fourth Embodiment

With reference to FIGS. 14 to 18, a fourth embodiment is explained. In the fourth embodiment, a Position Error Signal (PES) different for each servo write mode is obtained as a specific track PES by positioning the magnetic head 16 at a specific track position of the magnetic disk 11. Also, the magnetic head 16 is positioned at an arbitrary track of the magnetic disk 11 to obtain an arbitrary track PES. Then, the servo write mode is determined from the comparison result between a primary eccentric amount of each frequency component as a result of discrete Fourier transform of the obtained specific track PES and arbitrary track PES and an assumed primary eccentric amount and the comparison result between the specific track PES and the arbitrary track PES. Note that, as with the second and third embodiments, only the part different from the first embodiment is explained in the fourth embodiment.

Figure 14:
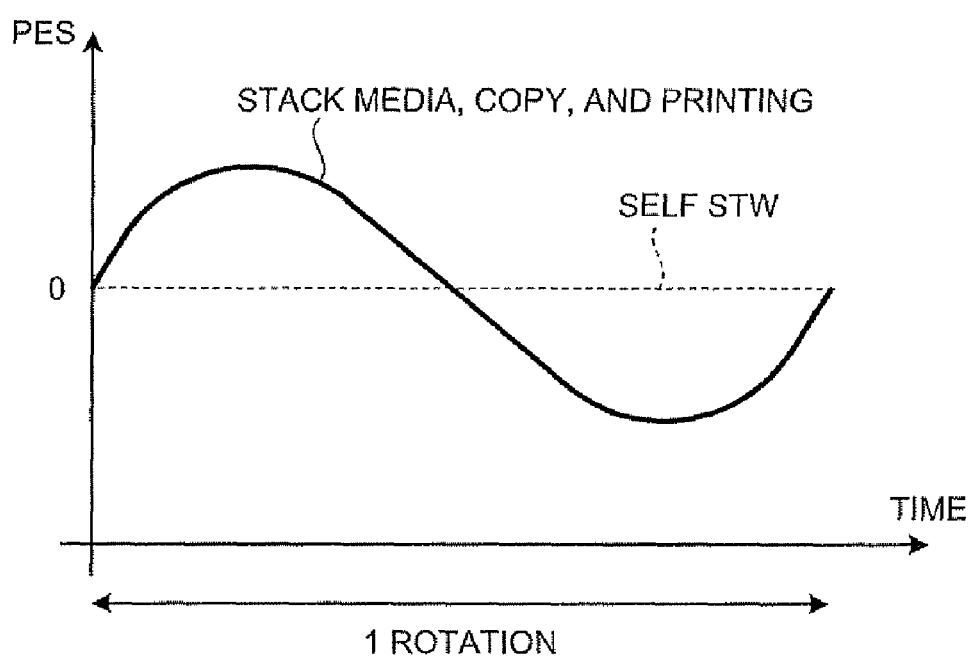
FIG. 14 is a drawing of a PES waveform for each servo-pattern generating scheme.

First, a PES waveform for each servo-pattern generating scheme is explained. FIG. 14 is a drawing of a PES waveform for each servo-pattern generating scheme. Here, PES is a signal indicative of an amount of fluctuation [nm] in strength of the signal read by the magnetic head 16 from the magnetic disk 11, the amount of fluctuation occurring due to eccentricity of the servo patterns due to eccentricity of the rotation axis of a motor of the STW writing the servo patterns and also due to eccentricity of the rotation axis of the SPM 12.

As depicted in FIG. 114, when the servo write mode is the "self STW" mode, servo patterns are written according to eccentricity of the rotation axis of the SPM 12 of its own device. Therefore, PES always indicates "0". However, in the "stack-media STW" mode, the "copy STW" mode, and the "magnetic printing" mode, servo patterns are written without consideration of eccentricity of the rotation axis of its own device, and therefore PES occurs.

Figures 15, 16:
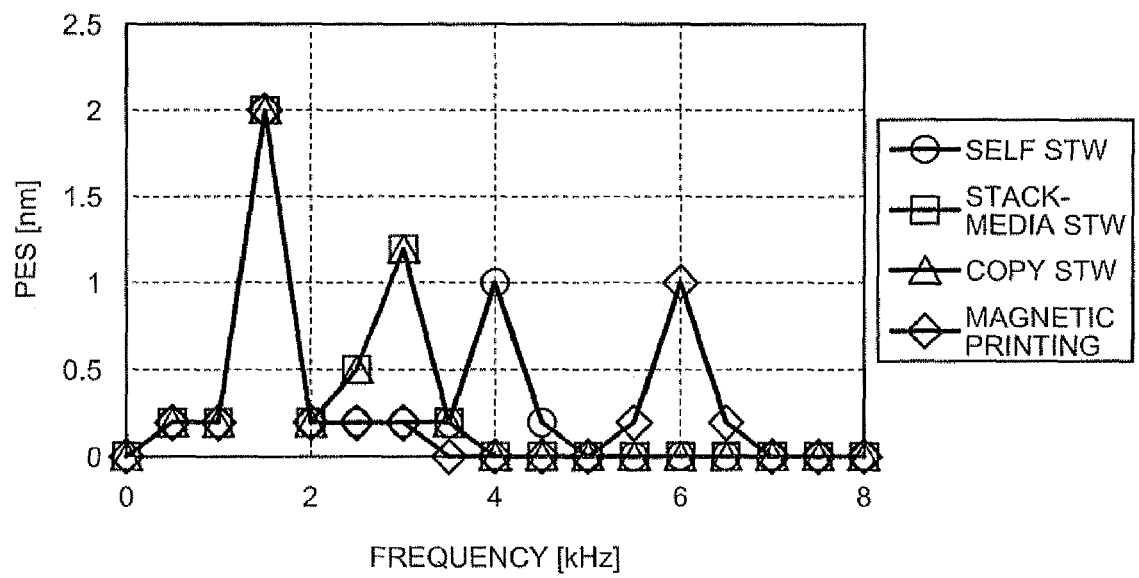
FIG. 15 is a drawing of PES frequency components at the time of track following for each servo-pattern generating scheme.
FIG. 16 is a drawing of a PES frequency-component characteristic table according to a fourth embodiment.

Furthermore, as depicted in FIG. 15, distribution characteristics of frequency components of PES obtained when PES at an arbitrary track on the magnetic disk 11 is subjected to Discrete Fourier Transform (DFT) vary for each servo write mode. For example, only when the servo write mode is the "magnetic printing mode", the peak of PES is present near 6 kHz of frequency.

Also, for example, a peak of PES near 1.5 kHz is due to external disturbance unique to the magnetic disk 11.

FIG. 16 is a drawing of a PES frequency-component characteristic table according to the fourth embodiment. The PES frequency-component characteristic table has stored therein characteristics of "PES frequency", "primary eccentric amount", and "presence of a surface with no servo pattern written" for each servo-pattern generating scheme.

As depicted in FIG. 16, the servo write mode can be identified with any one of "PES frequency", "primary eccentric amount", and "presence of a surface with no servo pattern written" different for each servo-write scheme or a combination of these.

For example, "presence of a surface with no servo pattern written" is "Yes" only in the "copy STW" mode. Also, a primary eccentric amount η(hd) (where "hd" is a parameter for identifying a plurality of magnetic heads 16) is equal to a primary eccentric amount of "0" only in the "self STW" mode.

Also, as for identification of the remaining "stack-media STW" mode and the "magnetic printing" mode, the following can be possible. That is, the frequency component as a result of subjecting DFT to PES has significantly different peak frequencies between the "magnetic printing" mode and the "stack-media STW" mode. Here, a frequency component of PES when the magnetic head 16 is caused to follow an arbitrary track is represented as "F2(hd, f)".

Therefore, when a frequency component F2(hd, $f_{STACK\_MEDIA\_STW\_MODE}$) at the time of arbitrary-track following does not exceed a frequency component F2(hd, $f_{MAGNETIC\_PRINTING\_MODE}$) the servo write mode is determined as the "magnetic printing" mode.

Figure 17:
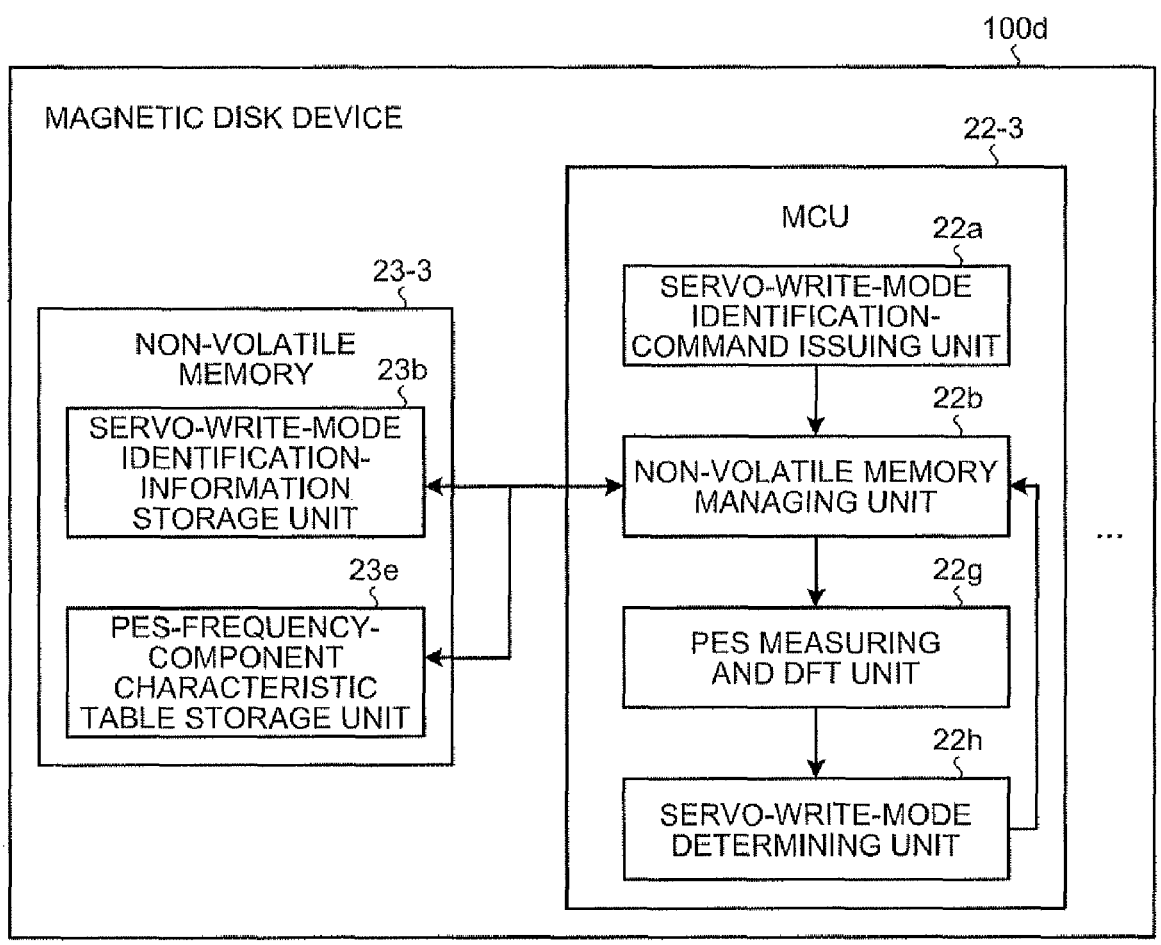
FIG. 17 is a functional block diagram of the configuration of an MCU of a magnetic disk device according to a fourth embodiment.

Next, the configuration of an MCU of a magnetic disk device according to the fourth embodiment is explained. FIG. 17 is a functional block diagram of the configuration of the MCU of the magnetic disk device according to the fourth embodiment. As depicted in the drawing, an MCU 22-3 of a magnetic disk device 110d according to the fourth embodiment includes the servo-write-mode identification-command issuing unit 22a, the non-volatile memory managing unit 22b, a PES measuring and DFT unit 22g, and a servo-write-mode determining unit 22h.

Also, a non-volatile memory 23-3 includes the servo-write-mode identification-information storage unit 23b and a PES-frequency-component characteristic table storage unit 23e storing the PES frequency-component characteristic table.

The PES measuring and DFT unit 22g measures PES on the magnetic disk 11 with the magnetic head 16 being pressed to the inner stopper 13, and further measures PES by causing the magnetic head 16 to follow an arbitrary track. Then, DFT is performed on the PES measured with the magnetic head 16 being pressed to the inner stopper 13 and the PES measured by causing the magnetic head 16 to follow the arbitrary track. Then, the DFT result is forwarded to the servo-write-mode determining unit 22h.

The servo-write-mode determining unit 22h determines a servo write mode used to write the servo patterns in the magnetic disk 11 through the explained determining scheme. Then, the servo-write-mode determining unit 22h instructs the non-volatile memory managing unit 22b to write the identification information of the determined servo write mode in the servo-write-mode identification-information storage unit 23b.

Figure 18:
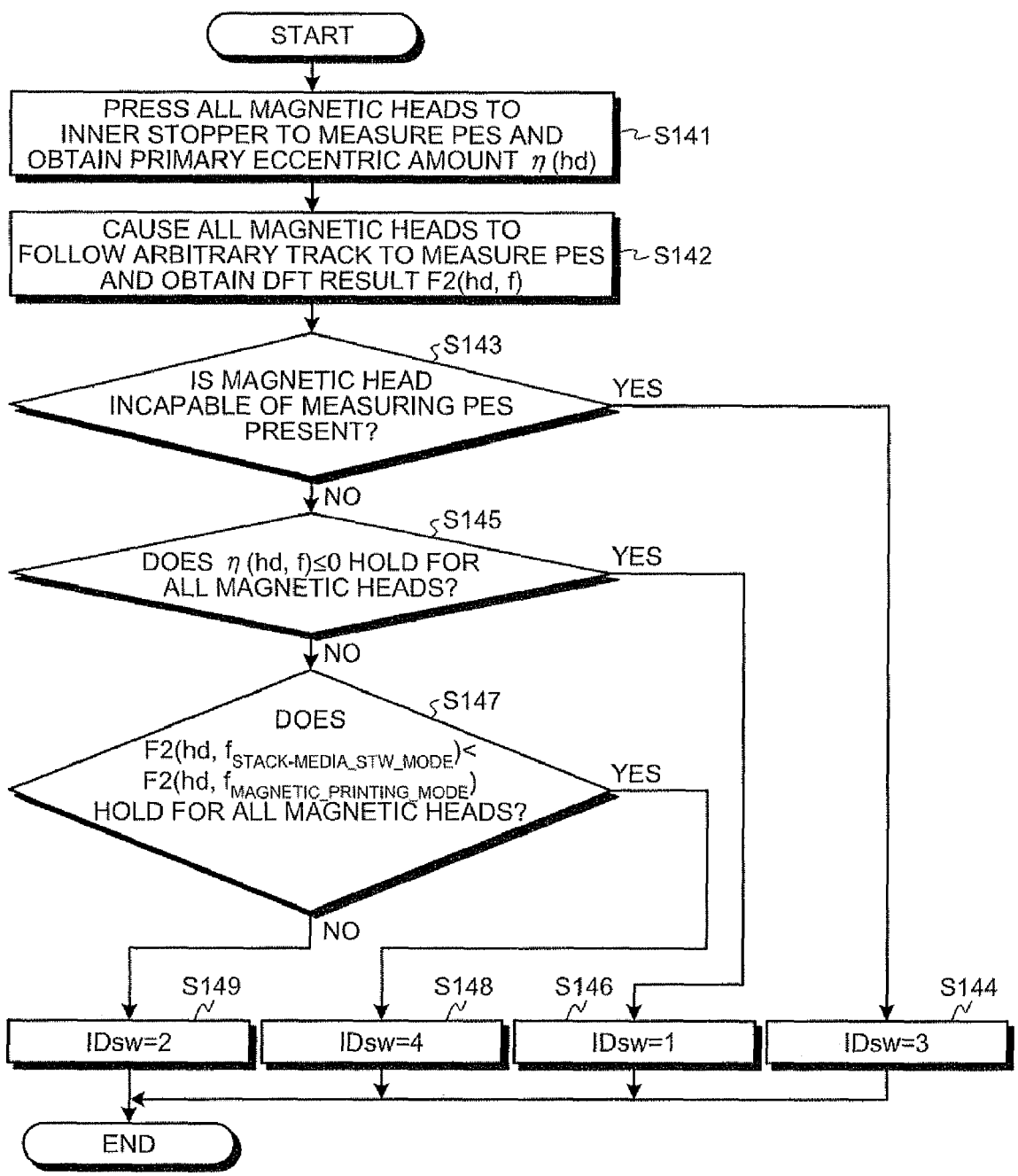
FIG. 18 is a flowchart of a servo-write-mode identifying process according to the fourth embodiment.

Next, a servo-write-mode identifying process according to the fourth embodiment is explained. FIG. 18 is a flowchart of a servo-write-mode identifying process according to the fourth embodiment. As depicted in the drawing, first at step S141, the PES measuring and DFT unit 22g causes all magnetic heads 16 to be pressed to the inner stopper 13 to measure PES to obtain a primary eccentric amount η(hd), and also obtain a result F1(hd, f) by subjecting the obtained primary eccentric amount η(hd) to DFT. Here, "hd" is a parameter for identifying the plurality of magnetic heads 16. Also, "f" indicates that F1(hd, f) is a function of a frequency f (kHz).

Here, "$f_{MAGNETIC\_PRINTING\_MODE}$" is a frequency at which a peak appears with the "magnetic printing" mode, and is 6 kHz in the example of FIG. 15. Similarly, "$f_{STACK\_MEDIA\_STW\_MODE}$" is a frequency at which a peak appears with the "stack-media STW" mode, and is 3 kHz in the example of FIG. 15.

Then at step S142, the PES measuring and DFT unit 22g causes all magnetic heads 16 to follow an arbitrary track of the magnetic disk 11 to measure PES to obtain a result F2(hd, f) by subjecting the result obtained by measuring PES to DFT.

Then at step S143, the servo-write-mode determining unit 22h determines whether any magnetic head 16 incapable of measuring PES is present. If any magnetic head 16 is incapable of measuring PES, this means that servo patterns are not written on the surface of the magnetic disk 11. Therefore, the servo write mode can be determined as the "copy STW" mode.

When it is determined that any magnetic head 16 incapable of measuring PES is present ("Yes" at step S143) the procedure goes to step S144. When it is not determined that any magnetic head 16 incapable of measuring PES is present ("No" at step S143), the procedure goes to step S145.

At step S144, since the servo write mode is determined as the "copy STW" mode, the servo-write-mode determining unit 22h sets, as corresponding identification information, "IDsw=3" to "IDsw" stored in the servo-write-mode identification-information storage unit 23b.

Then at step S145, the servo-write-mode determining unit 22h determines whether the primary eccentric amount η(hd, f) of all magnetic heads 16 is equal to or smaller than a primary eccentric amount "0" of the "self STW" mode. When it is determined that the primary eccentric amount η(hd, f) is equal to or smaller than a primary eccentric amount "0" of the "self STW" mode (in practice, equal to "0"), the servo write mode can be determined as the "self STW" mode.

When it is determined that the primary eccentric amount η(hd, f) is equal to or smaller than "0" ("Yes" at step S145), the procedure goes to step S146. When it is not determined that the primary eccentric amount η(hd, f) is equal to or smaller than "0" ("No" at step S145), the procedure goes to step S147.

At step S146, since the servo write mode is determined as the "self STW" mode, the servo-write-mode determining unit 22h sets, as corresponding identification information, "IDsw=1" to "IDsw" stored in the servo-write-mode identification-information storage unit 23b.

Then at step S147, the servo-write-mode determining unit 22h determines for all magnetic head 16 whether $F2(hd, f_{STACK\_MEDIA\_STW\_MODE}) < F2(hd, f_{MAGNETIC\_PRINTING\_MODE})$ holds. When it is determined for all magnetic head 16 that $F2(hd, f_{STACK\_MEDIA\_STW\_MODE}) < F2(hd, f_{MAGNETIC\_PRINTING\_MODE})$ holds, the servo write mode can be determined as the "magnetic printing" mode.

When it is determined for all magnetic head 16 that $F2(hd, f_{STACK\_MEDIA\_STW\_MODE}) < F2(hd, f_{MAGNETIC\_PRINTING\_MODE})$ holds ("Yes" at step S147), the procedure goes to step S148. When it is not determined for all magnetic head 16 that $F2(hd, f_{STACK\_MEDIA\_STW\_MODE}) < F2(hd, f_{MAGNETIC\_PRINTING\_MODE})$ holds ("No" at step S147), the procedure goes to step S149.

At step S148, since the servo write mode is determined as the "magnetic printing" mode, the servo-write-mode determining unit 22h sets, as corresponding identification information, "IDsw=4" to "IDsw" stored in the servo-write-mode identification-information storage unit 23b.

Also, at step S149, since the servo write mode is determined as the "stack-media STW" mode, the servo-write-mode determining unit 22h sets, as corresponding identification information, "IDsw=2" to "IDsw" stored in the servo-write-mode identification-information storage unit 23b.

According to the fourth embodiment, the servo write mode is identified in view of the characteristic of each servo write mode. Therefore, either of data and criterion or both based at the time of servo write is not required to be prepared in advance. Thus, the magnetic disk device can autonomously identify the servo write mode even when performing servo write in a conventional manner.

According to the first to fourth embodiments, the magnetic disk devices 100a to 100d (hereinafter, collectively referred to as a magnetic disk device 100) by itself autonomously identify the servo write mode used to write the servo pattern in the magnetic disk 11 of the own magnetic disk device, and stores identification information of the servo write mode in the servo-write-mode identification-information storage unit 23b of the non-volatile memory 23.

The firmware of the magnetic disk device 100 and the test program for testing the magnetic disk device 100 can be made as a single-design program not depending on the servo write mode if the control is branched according to the identification information stored in the servo-write-mode identification-information storage unit 23b.

Therefore, even if a magnetic disk device 100 having a magnetic disk 11 with servo patterns written therein with a different servo write mode is mixed in the manufacturing process, the test at the time of shipping can be performed irrespective of the servo write mode, thereby increasing efficiency of manufacturing the magnetic disk devices 100 and suppressing manufacturing cost.

[e] Other Embodiments

With any one of the first to fourth embodiments, the magnetic disk device 100 can autonomously recognize a servo write mode with which the servo patterns were written in the magnetic disk 11 of the magnetic disk device 100.

Therefore, efficiency of assembling the magnetic disk device can be increased, the time from the start of generating servo patterns until shipping can be reduced, and throughput of the assembling process can be improved. Also, since commonality is achieved between the test program and the firmware, the number of generating processes and the number of evaluating processes can be reduced. Even if magnetic disk devices are simultaneously assembled by using such a plurality of servo-pattern generating schemes, the same test program can be used for shipping inspection. Therefore, a burden on shipping inspectors can be significantly saved, thereby reducing manufacturing cost.

In the following, with reference to FIGS. 19 to 26, other embodiments are explained to also achieve effects of the first to fourth embodiments. In the other embodiments, the magnetic disk device 100 uses firmware or a test program downloaded from the host computer 200 to autonomously perform calibration of parameters required for servo control.

As an example of calibration, primary eccentricity correction, Repeatable Position Error (RPO, which is a repeatedly-occurring positioning error of the magnetic head 16) non-following, head change seek, and symmetry correction of a read channel are explained.

Figures 21, 22:
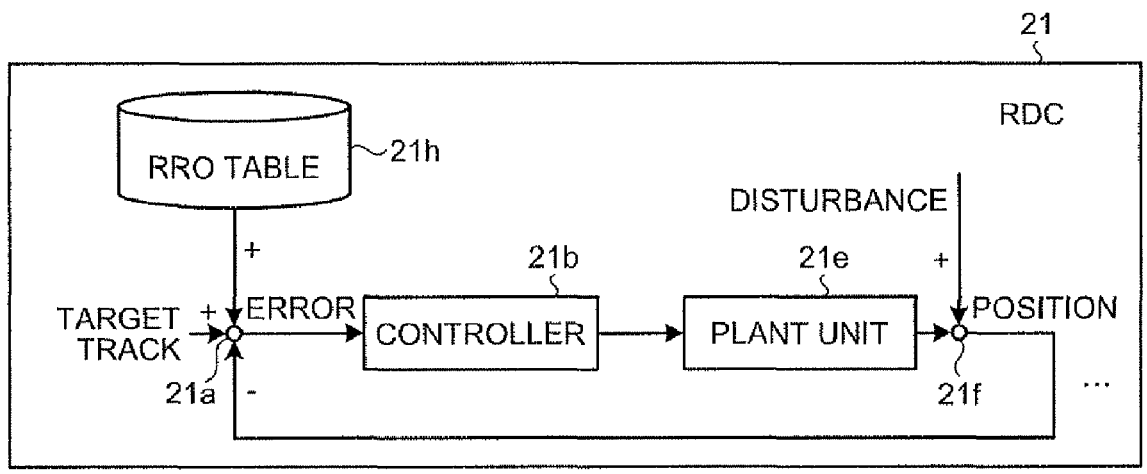
FIG. 21 is a drawing of the configuration of a servo control block of the read channel performing RRO non-following control.
FIG. 22 is a drawing of a correspondence of head change seek speeds for each servo-pattern generating scheme

First, with reference to FIGS. 19 to 21, a correcting method for each servo-pattern generating scheme at the time of track following is explained. FIG. 19 depicts details to be corrected at the time of track following for each servo-pattern generating scheme.

With reference to FIG. 19, for example, in the "self STW" mode, the magnetic head 16 of the magnetic disk device 100 itself is used for servo write. Therefore, normal servo control can be performed in which "correction of primary eccentric amount" is "not required", "repetitive correction" is "required", "zone width" is "normal", and "RRO non-following" is "not required".

However, in the "stack-media STW" mode, the "copy STW" mode, and the "magnetic printing" mode, since the primary eccentric amount is large, correction is required. Furthermore, in addition to correction of the "primary eccentric amount", higher-order eccentric components other than the primary ones have to be compressed with "repetitive correction". At this time, since the component is different for each radial position, the zone width has to be set to be "fine around the inner perimeter" in the "stack-media STW" mode and the "copy STW" mode, whilst the zone width has to be set to be "fine around inner and outer perimeters" in the "magnetic printing" mode.

Also, eccentric components shared in common between adjacent tracks have to be removed through feed forward control. Furthermore, "RRO non-following" is a mode in which RRO components exceeding a servo band are not caused to follow on purpose, thereby reducing Repeatable Position Error (RPE) and Non Repeatable Position Error (NRPE). In general, RRO is measured in each track and written in part of the magnetic disk 11, and then is read for use at the time of on-track.

Here, RPE is a component included in a positional difference Δe at the time of positioning control and synchronized with the rotation of the magnetic disk 11. NRPE is a component (asynchronous component) included in the positional difference Δe at the time of positioning control and not synchronized with the rotation of the magnetic disk 11. RRO and RPE, which are rotation synchronization components of the magnetic disk 11, each indicate a different value for each servo pattern written in a different servo write mode.

Note that, on the copy surface in the "self STW" mode and the "copy STW" mode, a desired following residue can be obtained without performing RRO non-following control, that is, the positional difference Δe is small.

Next, the configuration of a servo control block of the read channel for eccentricity correction is explained. FIG. 20 is a drawing of the configuration of a servo control block of a read channel (RDC) for eccentricity correction. As depicted in the drawing, an RDC 21 includes a differential unit 21a, a controller 21b for feedback control, a feed-forward unit 21c, an adder 21d, a plant unit 21e, an adder 21f, and an eccentricity correction table 21g.

The differential unit 21a accepts inputs of a target track r and a demodulation position y obtained by adding RRO to a current demodulation position by the adder 21f, adds r to a value obtained by reversing the sign of the demodulation position y, and then forwards the addition result to the controller 21b. That is, the addition result indicates a difference between the target track r and the demodulation position y output from the adder 21f.

Based on the addition result, the controller 21b accepting the addition result inputs to the adder 21d a feedback control signal U for correcting the difference between the target track r and the demodulation position y output from the adder 21f.

Further, the feed-forward unit 21c reads an eccentricity correction amount ΔU from the eccentricity correction table 21g having a variable eccentricity correction amount stored therein, and then inputs the read amount to the adder 21d. The adder 21d then adds an output U from the controller 21b and the output ΔU from the feed-forward unit 21c together, and inputs the addition result (U+ΔU) to the plant unit 21e.

The plant unit 21e accepts an input of the feedback control signal (U+ΔU) for movement control over the head actuator 15 and the magnetic head 16 mounted at the tip based on the feedback control signal (U+ΔU). Then, during this feedback control, the demodulation position y obtained by adding an influence of PRO to the demodulation position read via the magnetic head 16 for demodulation is input to the differential unit 21a. In this manner, eccentricity correction is performed by feedback control, thereby positioning the magnetic head 16 at the target position.

Next, the configuration of a servo control block of the read channel performing RRO non-following control is explained. FIG. 21 is a drawing of the configuration of a servo control block of the read channel performing RRO non-following control. As depicted in the drawing, the RDC 21 includes the differential unit 21a, the controller 21b for feedback control, the plant unit 21e, the adder 21f, and an RRO table 21h.

The differential unit 21a accepts inputs of the target track r, an RRO value s from the RRO table 21h, and the demodulation position y obtained by adding RRO to the current demodulation position output from the plant unit 21e by the adder f, adds r to a value obtained by reversing the sign of the demodulation position y, and then forwards the addition result to the controller 21b. That is, the addition result is a difference among the target track r, the RRO value s, and the demodulation value y output from the adder 21f.

In the adder 21a, the RRO value s is added in advance, thereby removing the influence of the RRO value s from the demodulation value y output from the adder 21f, thereby achieving RRO non-following.

Based on the addition result, the controller 21b accepting the addition result inputs to the plant unit 21e a feedback control signal U for correcting the difference between the target track r and the demodulation position y output from the adder 21f.

The plant unit 21e accepts an input of the feedback control signal U for movement control over the head actuator 15 and the magnetic head 16 mounted at the tip based on the feedback control signal U.

Then, during this feedback control, the demodulation position y obtained by adding an influence of PRO to the demodulation position read via the magnetic head 16 for demodulation is output to the differential unit 21a. In this manner, with RRO non-following control, the magnetic head 16 can be positioned at the target position.

Next, with reference to FIGS. 22 and 23, a method of selecting a head change seek different for each servo-pattern generating scheme is explained. FIG. 22 is a drawing of details of selection of a head change seek different for each servo-pattern generating scheme.

As depicted in FIG. 22, except for the case in which the eccentricity is the same between the magnetic disk medium before seek and the magnetic disk medium after seek (corresponding to different medium seek with the "stack-media STW" mode and same medium seek and different medium seek with the "magnetic printing" mode), there is a high possibility of the occurrence of error in high-speed head seek control. Therefore, head seek control at normal speed is performed.

Note that, in general, the magnetic disk device 100 is configured of a plurality of magnetic disks 11 being stacked each with a predetermined space. Head change seek to a different medium is called "different medium seek", whilst head change seek to the same medium is called "same medium seek".

Next, a seek-mode selecting process is explained. FIG. 23 is a flowchart of a seek-mode selecting process. As depicted in the drawing, first at step S151, the MCU 22 of the magnetic disk apparatus 100 obtains servo-write-mode identification information.

Then at step S152, the MCU 22 determines whether the magnetic head as a positioning target is the currently-positioned same magnetic head.

When it is determined that the magnetic head as a positioning target is the currently-positioned magnetic head ("Yes" at step S152), the procedure goes to step S153. When it is not determined that the magnetic head as a positioning target is the currently-positioned magnetic head ("No" at step S152), the procedure goes to step S154.

At step S153, the MCU 22 selects high-speed seek as a head change seek mode. After this process, the seek-mode selecting process ends.

At step S154, the MCU 22 determines whether the target magnetic disk is the magnetic disk at which the magnetic head is currently positioned. When it is determined that the target magnetic disk is the magnetic disk at which the magnetic head is currently positioned ("Yes" at step S154), the procedure goes to step S155. When it is not determined that the target magnetic disk is the magnetic disk at which the magnetic head is currently positioned ("No" at step S154), the procedure goes to step S157.

At step S155, the MCU 22 determines based on the servo-write-mode identification information whether the servo write mode is the "magnetic printing" mode. When it is determined that the servo write mode is the "magnetic printing" mode ("Yes" at step S155), the procedure goes to step S156. When it is not determined that the servo write mode is the "magnetic printing" mode ("No" at step S155) the procedure goes to step S153.

At step S156, the MCU 22 selects normal seek as a head change seek mode. After this process, the seek-mode selecting process ends.

At step S157, the MCU 22 determines based on the servo-write-mode identification information whether the servo write mode is the "self STW" mode or the "copy STW" mode. When it is determined that the servo write mode is the "self STW" mode or the "copy STW" mode ("Yes" at step S157), the procedure goes to step S153. When it is not determined that the servo write mode is the "self STW" mode or the "copy STW" mode ("No" at step S157), the procedure goes to step S158.

At step S158, the MCU 22 determines based on the servo-write-mode identification information whether the servo write mode is the "stack-media STW" mode. When it is determined that the servo write mode is the "stack-media STW" mode ("Yes" at step S158), the procedure goes to step S156. When it is not determined that the servo write mode is the "stack-media STW" mode ("No" at step S158), the procedure goes to step S159.

At step S159, the MCU 22 cannot determine the servo write mode, and therefore outputs an error report to the host computer 200 via the HDC 24. After this process, the seek-mode selecting process ends.

Figure 24A:
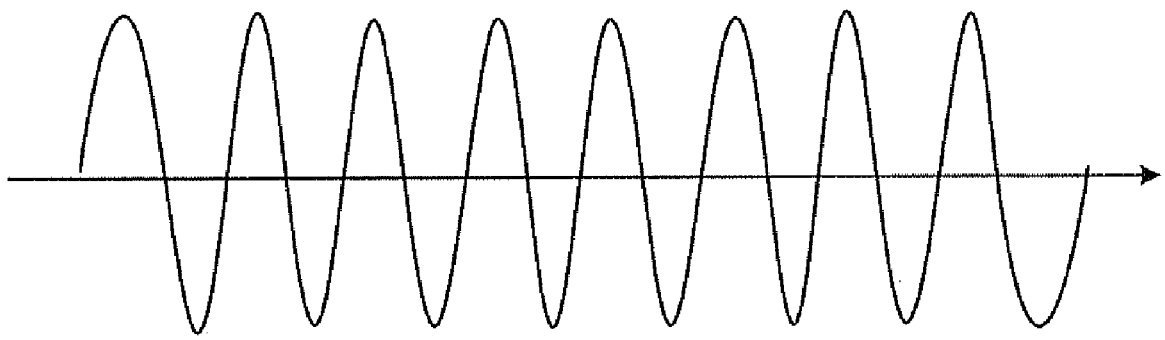
FIG. 24A is a drawing of a waveform when a read signal from the magnetic disk is symmetrical.

Next, with reference to FIGS. 24A and 24B through 26, correction of a servo-pattern read signal is explained. FIG. 24A is a drawing of a waveform when a read signal from the magnetic disk is symmetrical. In this case, output fluctuations in the read signal from the magnetic disk are vertically symmetrical with respect to the horizontal axis, indicating that the read signal is good.

Figure 24B:
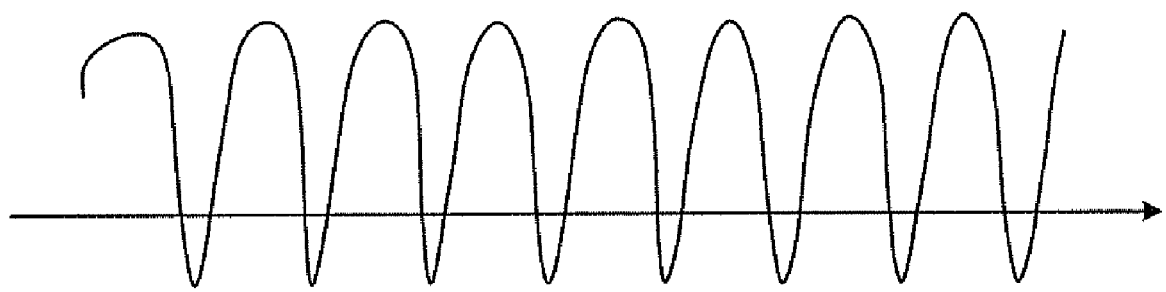
FIG. 24B is a drawing of a waveform when the read signal from the magnetic disk is asymmetrical.

On the other hand, FIG. 24B is a drawing of a waveform when the read signal from the magnetic disk is asymmetrical. This case can be observed in a servo write mode of the "magnetic printing" mode. Output fluctuations in the read signal from the magnetic disk are leaning to upside or downside with respect to the horizontal axis and asymmetrical, indicating that the read signal is poor. This is a phenomenon occurring due to a shortage of magnetic force at a servo-pattern printing stage, compared with the magnetic force of magnetization at an initializing stage.

Figure 25:
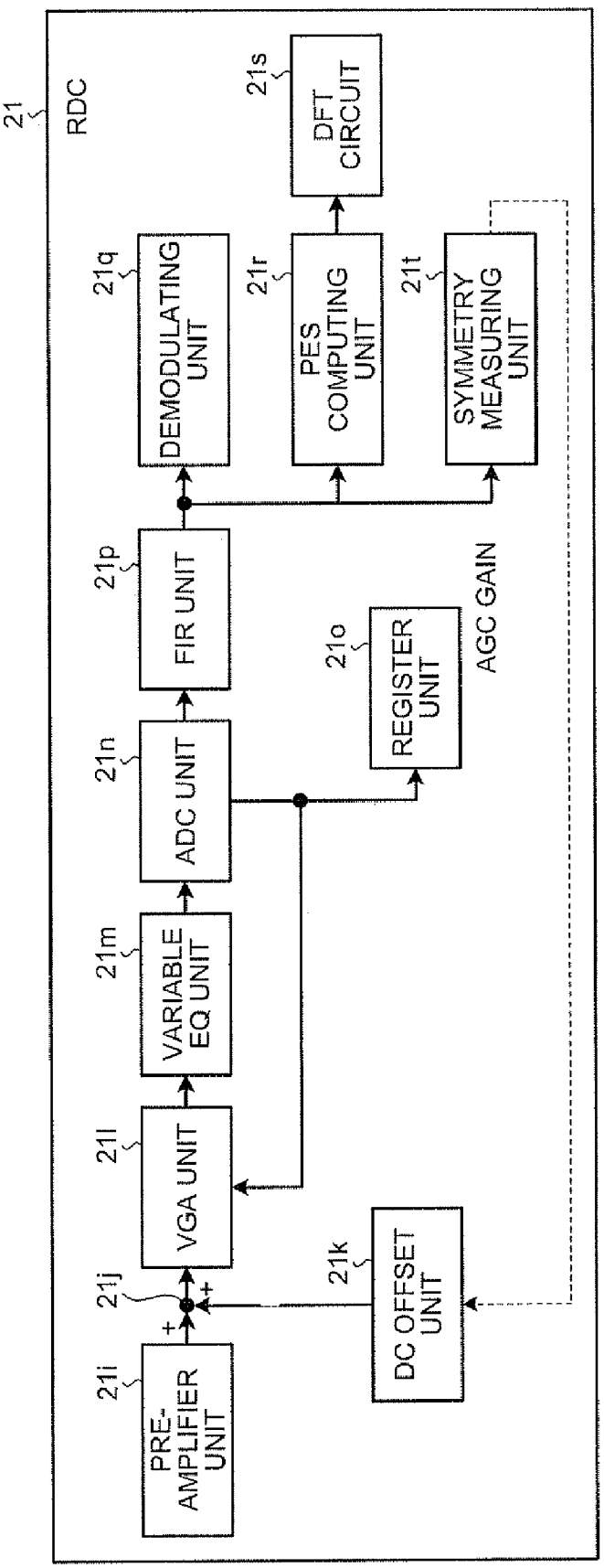
FIG. 25 is a block diagram of the configuration of a read channel correcting asymmetry of the read signal.

Next, the configuration of a read channel (RDC) correcting asymmetry of the read signal is explained. FIG. 25 is a block diagram of the configuration of an RDC removing a direct-current component from the read signal. As depicted in the drawing, an RDC 21 includes a preamplifier unit 21i, an adder 21j, a Direct-Current (DC) offset unit 21k, a Variable Gain Amplifier (VGA) unit 211, a variable Equalizer (EQ) unit 21m, an Analog Digital Converter (ADC) unit 21n, a register unit 21o having stored therein an Automatic Gain Control (AGC) gain value, a Finite Impulse Response (FIR) unit 21p, a demodulating unit 21q, a PES computing unit 21r, a DFT circuit 21s, and a symmetry measuring unit 21t.

As depicted in FIG. 24B, when output fluctuations in the read signal from the magnetic disk are asymmetrical with respect to the horizontal axis, a DC offset is input through feed-forward before being input to the VGA unit 211, thereby reducing the probability of occurrence of demodulation error. Such a process of feed-forwarding the DC offset by the DC offset unit 21k is called "symmetry correction FF".

Also in adjustment of the variable EQ unit 21m, there is a difference in frequency characteristics among the "stack-media STW" mode, the "copy STW" mode, and the "magnetic printing" mode due to the fact that servo write was not performed by the magnetic head of the own device. Therefore, adjustment to each optimal value is required. Such adjustment by the variable EQ unit 21m is called "variable EQ adjustment".

On the copy surface in the "self STW" mode and the "copy STW" mode, a calibration value of user data recorded on the magnetic disk of the magnetic disk device can be used. Therefore, a burden of adjustment can be saved.

FIG. 26 is a drawing as to whether "symmetry correction Feed Forward (FF)" and "variable EQ adjustment" are required for each servo write mode. Here, "seed surface" means a surface of a magnetic disk of the copy source in which servo patterns have been already written with the "copy STW" mode.

In the foregoing, while the embodiments of the present invention have been explained, the present invention is not meant to be restricted by these embodiments. Various embodiments can be further implemented within the range of technical ideas recited in the claims. Also, the effects of the present invention are not meant to be restricted to the effects explained in the embodiments.

In the first to fourth embodiments, the obtained servo-write-mode identification information is stored in the non-volatile memory 23 (23-1, 23-2, or 23-3). However, this is not meant to be restrictive. The obtained servo-write-mode identification information may be stored in a predetermined storage area of the magnetic disk 11 (for example, a system area track depicted in FIG. 13). With this, the non-volatile memory 23 is not required and can be omitted, thereby reducing parts cost and assembling cost of the magnetic disk device 100.

Furthermore, among the various processes explained in the embodiments, all or part of the processes explained as being automatically performed may be manually performed, or all or part of the processes explained as being manually performed may be automatically performed through a known method. Still further, the process procedure, the control procedure, specific names, and information including various data and parameters explained in the embodiments can be arbitrarily changed unless otherwise specified.

Still further, each component depicted is conceptual in function, and is not necessarily physically configured as depicted. That is, specific patterns of distribution and unification of the components are not meant to be restricted to those depicted in the drawings. All or part of the components can be functionally or physically distributed or unified in arbitrary units according to various loads and the state of use.

Still further, all or arbitrary part of the process functions performed in the magnetic disk device 100 can be achieved by a Central Processing Unit (CPU) (or a microcomputer, such as Micro Processing Unit (MPU)) and a program analyzed and executed on that CPU (or a microcomputer, such as MPU), or can be achieved as hardware with a wired logic.

According to the disclosed storage device, control circuit for the storage device, and servo-write-mode identifying method, effects can be achieved such that the number of processes of manufacturing the storage device can be suppressed, thereby decreasing manufacturing cost of the storage device and reducing manufacturing time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage device comprising:
   a servo-write-mode determining unit that determines which servo write mode is used to write servo information in a storage medium of the storage device; and an identification-information storage unit that stores identification information for identifying the servo write mode determined by the servo-write-mode determining unit.

2. The storage device according to claim 1, further comprising a servo-mark-information storage unit that stores servo mark information indicative of a correspondence among the servo write mode, the identification information, and servo mark, wherein the servo-write-mode determining unit includes a servo-mark detecting unit that detects in the storage medium a servo mark of the servo information written in the storage medium, the servo-mark detecting unit detects in the storage medium a servo mark matching the servo mark of the servo mark information, and when a servo mark matching the servo mark in the servo mark information is detected in the storage medium, by the servo-mark detecting unit, the identification-information storage unit stores the identification information corresponding to the detected servo mark.

3. The storage device according to claim 1, wherein the servo-write-mode determining unit includes an identification-information reading unit that reads the identification information written in the storage medium, and the identification-information storage unit stores the identification information read by the identification-information reading unit.

4. The storage device according to claim 1, wherein the servo-write-mode determining unit includes a track-number obtaining unit that positions, for each servo write mode for writing servo information in the storage medium, a head at a specific track position of the storage medium with a track number with a different offset amount from a reference track number provided in advance and obtains a track number of the specific track position via the head, and the servo-write-mode determining unit determines a servo write mode whose offset amount is equal to a difference between the track number of the specific track position obtained by the track-number obtaining unit and the reference track number, and the identification-information storage unit stores identification information for identifying the servo write mode corresponding to the offset amount determined by the servo-write-mode determining unit.

5. The storage device according to claim 4, wherein the track-number obtaining unit positions a plurality of the heads simultaneously moving to a same track of the storage medium at the specific track position and calculates an average of track numbers obtained at the specific track position via the heads, the servo-write-mode determining unit determines a servo write mode whose offset amount is equal to a difference between the average of the track numbers calculated by the track-number obtaining unit and the reference track number.

6. The storage device according to claim 1, wherein the servo-write-mode determining unit includes a specific-track PES obtaining unit that causes a head to be positioned at a specific track position of the storage medium and obtains via the head a Position Error Signal (PES) different for each servo write mode for writing servo information in the storage medium as a specific track PES;

an arbitrary-track PES obtaining unit that causes the head to be positioned at an arbitrary track position of the storage medium and obtains via the head a PES of an arbitrary track as an arbitrary track PES; and a frequency-component obtaining unit that subjects the specific track PES obtained by the specific-track-PES obtaining unit and the arbitrary track PES obtained by the arbitrary-track-PES obtaining unit to discrete Fourier transform and obtains each frequency component, and the servo-write-mode determining unit determines the servo write mode from a comparison result between a primary eccentric amount of the frequency component obtained by the frequency-component obtaining unit and an assumed primary eccentric amount and a comparison result between the specific track PES and the arbitrary track PES.

7. The storage device according to claim 1, wherein the identification-information storage unit is provided to a storage area of the storage medium.

8. A control circuit for a storage device, comprising:

a servo-write-mode determining unit that determines which servo write mode is used to write servo information in a storage medium of the storage device; and an identification-information storage unit that stores identification information for identifying the servo write mode determined by the servo-write-mode determining unit.

9. The control circuit according to claim 8, further comprising a servo-mark-information storage unit that stores servo mark information indicative of a correspondence among the servo write mode, the identification information, and servo mark, wherein the servo-write-mode determining unit includes a servo-mark detecting unit that detects in the storage medium a servo mark of the servo information written in the storage medium, the servo-mark detecting unit detects in the storage medium a servo mark matching the servo mark of the servo mark information, and when a servo mark matching the servo mark in the servo mark information is detected in the storage medium, by the servo-mark detecting unit, the identification-information storage unit stores the identification information corresponding to the detected servo mark.

10. The control circuit according to claim 8, wherein the servo-write-mode determining unit includes an identification-information reading unit that reads the identification information written in the storage medium, and the identification-information storage unit stores the identification information read by the identification-information reading unit.

11. The control circuit according to claim 8, wherein the servo-write-mode determining unit includes a track-number obtaining unit that positions, for each servo write mode for writing servo information in the storage medium, a head at a specific track position of the storage medium with a track number with a different offset amount from a reference track number provided in advance and obtains a track number of the specific track position via the head, and the servo-write-mode determining unit determines a servo write mode whose offset amount is equal to a difference between the track number of the specific track position obtained by the track-number obtaining unit and the reference track number, and the identification-information storage unit stores identification information for identifying the servo write mode corresponding to the offset amount determined by the servo-write-mode determining unit.

12. The control circuit according to claim 11, wherein
the track-number obtaining unit positions a plurality of the heads simultaneously moving to a same track of the storage medium at the specific track position and calculates an average of track numbers obtained at the specific track position via the heads,
the servo-write-mode determining unit determines a servo write mode whose offset amount is equal to a difference between the average of the track numbers calculated by the track-number obtaining unit and the reference track number.

13. The control circuit according to claim 8, wherein
the servo-write-mode determining unit includes
a specific-track PES obtaining unit that causes a head to be positioned at a specific track position of the storage medium and obtains via the head a Position Error Signal (PES) different for each servo write mode for writing servo information in the storage medium as a specific track PES;
an arbitrary-track PES obtaining unit that causes the head to be positioned at an arbitrary track position of the storage medium and obtains via the head a PES of an arbitrary track as an arbitrary track PES; and
a frequency-component obtaining unit that subjects the specific track PES obtained by the specific-track-PES obtaining unit and the arbitrary track PES obtained by the arbitrary-track-PES obtaining unit to discrete Fourier transform and obtains each frequency component, and
the servo-write-mode determining unit determines the servo write mode from a comparison result between a primary eccentric amount of the frequency component obtained by the frequency-component obtaining unit and an assumed primary eccentric amount and a comparison result between the specific track PES and the arbitrary track PES.

14. The control circuit according to claim 8, wherein
the identification-information storage unit is provided to a storage area of the storage medium.

15. A servo-write-mode identifying method for a control circuit for a storage device, comprising:
determining which servo write mode is used to write servo information in a storage medium of the storage device; and
storing identification information for identifying the servo write mode determined by the servo-write-mode determining unit.

* * * * *